(12) United States Patent
Kim et al.

(10) Patent No.: US 6,900,856 B2
(45) Date of Patent: May 31, 2005

(54) LIQUID CRYSTAL DISPLAY DEVICE AND MANUFACTURING METHOD THEREOF

(75) Inventors: Woong-Kwon Kim, Gyeonggi-do (KR); Se-June Kim, Seoul (KR); Jong-Hwae Lee, Seoul (KR)

(73) Assignee: LG. Philips LCD Ltd., Seoul (KR)

( * ) Notice: Subject to any disclaimer, the term of this patent is extended or adjusted under 35 U.S.C. 154(b) by 85 days.

(21) Appl. No.: 10/653,908

(22) Filed: Sep. 4, 2003

(65) Prior Publication Data

US 2004/0109101 A1 Jun. 10, 2004

(30) Foreign Application Priority Data

Dec. 4, 2002 (KR) .............................. 10-2002-0076724
Dec. 9, 2002 (KR) .............................. 10-2002-0077950

(51) Int. Cl.$^7$ .............................................. G02F 1/136
(52) U.S. Cl. ..................... 349/44; 349/106; 349/110; 345/88
(58) Field of Search ........................ 349/44, 110, 106, 349/108; 345/88

(56) References Cited

U.S. PATENT DOCUMENTS

| | | | | |
|---|---|---|---|---|
| 5,926,702 A | * | 7/1999 | Kwon et al. | ................ 438/158 |
| 5,976,734 A | | 11/1999 | Yamaguchi | ..................... 430/7 |
| 6,031,512 A | * | 2/2000 | Kadota et al. | ................ 345/88 |
| 2002/0079501 A1 | * | 6/2002 | Okada et al. | ................. 257/88 |

* cited by examiner

*Primary Examiner*—Kenneth Parker
*Assistant Examiner*—Phu Vu
(74) *Attorney, Agent, or Firm*—Morgan Lewis & Bockius LLP

(57) ABSTRACT

A manufacturing method of a liquid crystal display device includes steps of forming liquid crystal display by patterning the passivation layer and the gate insulating layer by using the black matrix as an etching mask to expose the portion of the drain electrode, the gate pad, and the data pad, forming a first transparent conductive layer on the black matrix, wherein the first transparent conductive layer contacts the portion of the drain electrode, the gate pad, and the data pad, forming a color filter layer on the first transparent conductive layer in the opening, forming a second transparent conductive layer on the color filter layer, the second transparent conductive layer contacting the first transparent conductive layer, and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

43 Claims, 38 Drawing Sheets

LIQUID CRYSTAL DISPLAY DEVICE AND MANUFACTURING METHOD THEREOF

This application claims the benefit of Korean Patent Application Nos. 2002-76724 filed in Korea on Dec. 4, 2002 and 2002-77950 filed in Korea on Dec. 9, 2002, which are both hereby incorporated by reference.

BACKGROUND OF THE INVENTION

1. Field of the Invention

The present invention relates to a liquid crystal display device, and more particularly, to a liquid crystal display device having a color filter layer on an array substrate and a manufacturing method thereof.

2. Discussion of the Related Art

A liquid crystal display (LCD) device is driven based on the optical anisotropy and polarization characteristics of a liquid crystal material. In general, the LCD device includes two substrates that are spaced apart and face each other, and a liquid crystal material layer interposed between the two substrates. Each of the substrates includes electrodes that face each other, wherein a voltage applied to each electrode induces an electric field perpendicular to the substrates between the electrodes. An alignment of liquid crystal molecules of the liquid crystal material layer changes by varying an intensity or direction of the applied electric field. Accordingly, the LCD device displays an image by varying light transmittance through the liquid crystal material layer in accordance with the arrangement of the liquid crystal molecules.

FIG. 1 is an expanded perspective view illustrating a related art LCD device. As shown in FIG. 1, the LCD device 11 includes an upper substrate 5, referred to as a color filter substrate, and a lower substrate 22, referred to as an array substrate, having a liquid crystal material layer 14 interposed therebetween. On the upper substrate 5, a black matrix 6, and a color filter layer 8 are formed in a shape of an array matrix including a plurality of red (R), green (G), and blue (B) color filters surrounded by corresponding portions of the black matrix 6. Additionally, a common electrode 18 is formed on the upper substrate 5 to cover the color filter layer 8 and the black matrix 6.

On the lower substrate 22, a plurality of thin film transistors (TFTs) T are formed as an array matrix corresponding to the color filter layer 8. A plurality of crossing gate lines 13 perpendicularly cross a plurality of data lines 15. The TFTs T are positioned such that each TFT T is located adjacent to an intersection of one of the gate lines 13 and one of the data lines 15. Furthermore, a plurality of pixel electrodes 17 are formed on a pixel region P defined between the gate lines 13 and the data lines 15 of the lower substrate 22. The pixel electrode 17 includes a transparent conductive material having high transmittance, such as indium-tin-oxide (ITO) or indium-zinc-oxide (IZO).

As further shown in FIG. 1, a storage capacitor $C_{ST}$ is disposed in each pixel P and connected in parallel to the pixel electrode 17 of the pixel. The storage capacitor $C_{ST}$ is comprised of a portion of the gate line 13 as a first capacitor electrode and a metal layer 30 as a second capacitor electrode. Since the metal layer 30 is connected to the pixel electrode 17 through a contact hole, the storage capacitor $C_{ST}$ is electrically contacted to the pixel electrode 17. The metal layer 30 may be made of the same material as the data line 15. When fabricating the LCD device 11 of FIG. 1, the upper substrate 5 is aligned with and attached to the lower substrate 22. In this process, the upper substrate 5 may be misaligned with the lower substrate 22 and light leakage may occur in the completed LCD device 11 due to an error margin in attaching the upper and lower substrate 5 and 22.

FIG. 2 is a cross-sectional view along the line II–II' of FIG. 1, illustrating a pixel of the related art liquid crystal display (LCD) device. As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed therebetween. The upper and lower substrates 5 and 22 are often referred to as an array substrate and a color filter substrate, respectively, because the color filter layer 8 is formed upon the upper substrate and a plurality of array elements are formed on the lower substrate 22. As further shown in FIG. 2, the thin film transistor T is formed on an inner surface of the lower substrate 22, and a passivation layer 40 is formed on the thin film transistor T. The thin film transistor T includes a gate electrode 32, an active layer 34, a source electrode 36, and a drain electrode 38.

Referring to FIG. 1, the gate electrode 32 extends from the gate line 13 and the source electrode 36 extends from the data line 15. The gate, source, and drain electrodes 32, 36, and 38 are formed of a metallic material while the active layer 34 is formed of silicon. The pixel electrode 17 that is formed of a transparent conducting material is disposed in the pixel region P.

As shown in FIG. 2, the pixel electrode 17 contacts the drain electrode 38 and the metal layer 30. As mentioned above, the gate electrode 13 acts as a first electrode of the storage capacitor $C_{ST}$ and the metal layer 30 acts as a second electrode of the storage capacitor $C_{ST}$. Thus, the gate electrode 13 and the metal layer 30 are parts of the storage capacitor $C_{ST}$.

Still referring to FIG. 2, the upper substrate 5 is spaced apart from the first substrate 22 over the thin film transistor T. On the rear surface of the upper substrate 5, a black matrix 6 is disposed in the position corresponding to the thin film transistor T and the gate line 13. The black matrix 6 is formed on the entire surface of the upper substrate 5 and has openings corresponding to the pixel electrode 17 of the lower substrate 11, as shown in FIG. 1. The black matrix 6 prevents light leakage in the LCD panel except for the portion for the pixel electrode 17. The black matrix 6 protects the thin film transistor T from the light such that the black matrix 6 prevents generating of photo current in the thin film transistor T. The color filter layer 8 is formed on the rear surface of the upper substrate 5 to cover the black matrix 6. Each of the color filters 8 has one of the red, green, and blue colors and corresponds to one pixel region where the pixel electrode 17 is located. A common electrode 18 formed of a transparent conductive material is disposed on the color filter layer 8 over the upper substrate 5.

In the related art LCD panel mentioned above, each pixel electrode 17 corresponds to each color filter. Furthermore, in order to prevent a cross-talk between the pixel electrode 17 and the gate and data lines 13 and 15, the pixel electrode 17 is spaced apart from the data line 15 by the distance A and from the gate line 13 by the distance C, as shown in FIG. 2. The open spaces A and C between the pixel electrode 17 and the data and gate lines 15 and 13 cause a malfunction, such as light leakage, in the LCD device. Typically, the light leakage mainly occurs in the open spaces A and C. However, the black matrix 6 formed on the upper substrate 5 should cover those open spaces A and C. But when arranging the upper substrate 5 with the lower substrate 22 or vice versa, a misalignment may occur between the upper substrate 5 and the lower substrate 22. Therefore, the black matrix 6 is extended to more than cover those open spaces A and C. That is, the black matrix 6 is designed to provide an aligning margin to prevent light leakage. However, when extending the black matrix, an aperture ratio of the liquid crystal panel is reduced in as much as the aligning margin of the black matrix 6 is increased. Moreover, if there are errors in the aligning margin of the black matrix 6, the light leakage occurs in the open spaces A and C, and deteriorates the image quality of the LCD device.

SUMMARY OF THE INVENTION

Accordingly, the present invention is directed to a liquid crystal display (LCD) device having a color filter on an array substrate and a manufacturing method thereof that substantially obviates one or more of the problems due to limitations and disadvantages of the related art.

Another object of the present invention is to provide a liquid crystal display device that has a high aperture ratio.

Another object of the present invention is to provide a manufacturing method of a liquid crystal display device that simplifies a manufacturing process and increases a manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of a liquid crystal display device includes steps of forming a gate line, a gate electrode and a gate pad on a substrate, forming a gate insulating layer on the gate line, the gate electrode and the gate pad, forming a semiconductor layer on the gate insulating layer over the gate electrode, forming a data line, a source electrode, a drain electrode, and a data pad, wherein the data line crosses the gate line to define a pixel area, the source and drain electrodes are disposed over the semiconductor layer spacing apart from each other, and the data pad is disposed at one end of the data line, and wherein the gate electrode, the semiconductor layer, and the source and drain electrodes constitute a thin film transistor, forming a passivation layer covering the thin film transistor, forming a black matrix on the passivation layer, wherein the black matrix has an opening corresponding to the pixel area and the opening exposes the passivation layer on a portion of the drain electrode, patterning the passivation layer and the gate insulating layer by using the black matrix as an etching mask to expose the portion of the drain electrode, the gate pad, and the data pad, forming a first transparent conductive layer on the black matrix, wherein the first transparent conductive layer contacts the portion of the drain electrode, the gate pad, and the data pad, forming a color filter layer on the first transparent conductive layer in the opening, forming a second transparent conductive layer on the color filter layer, the second transparent conductive layer contacting the first transparent conductive layer, and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

In another aspect of the present invention, a manufacturing method of a liquid crystal display device includes steps of forming a gate line, a gate electrode and a gate pad on a substrate, forming a gate insulating layer on the gate line, the gate electrode and the gate pad, forming a semiconductor layer on the gate insulating layer over the gate electrode, forming a data line, a source electrode, a drain electrode, a capacitor electrode and a data pad, wherein the data line crosses the gate line to define a pixel area, the source and drain electrodes are disposed over the semiconductor layer spaced apart from each other, the capacitor electrode overlaps a part of the gate line, and the data pad is disposed at one end of the data line, and wherein the gate electrode, the semiconductor layer, and the source and drain electrodes constitute a thin film transistor, forming a passivation layer covering the thin film transistor, forming a gate pad contact hole exposing the gate pad by patterning the passivation layer and the gate insulating layer over the gate pad contact hole, forming a black matrix on the passivation layer, wherein the black matrix has an opening corresponding to the pixel area and the opening exposes the passivation layer on portions of the drain electrode and the capacitor electrode, selectively patterning the passivation layer by using the black matrix as an etching mask to expose the portions of the drain electrode and the capacitor electrode, and the data pad, forming a first transparent conductive layer on the black matrix, wherein the first transparent conductive layer contacts the portions of the drain electrode and the capacitor electrode, the gate pad and the data pad, forming a color filter layer on the first transparent conductive layer in the opening, forming a second transparent conductive layer on the color filter layer, the second transparent conductive layer contacting the first transparent conductive layer, and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

In another aspect of the present invention, a manufacturing method of a liquid crystal display device includes steps of forming a gate line, a gate electrode and a gate pad on a substrate, forming a gate insulating layer on the gate line, the gate electrode and the gate pad, forming a semiconductor layer on the gate insulating layer over the gate electrode, forming a data line, a source electrode, a drain electrode, a capacitor electrode and a data pd, wherein the data line crosses the gate line to define a pixel area, the source and drain electrodes are disposed over the semiconductor layer spaced apart from each other, the capacitor electrode overlaps a part of the gate line, and the data pad is disposed at one end of the data line, and wherein the gate electrode, the semiconductor layer, and the source and drain electrodes constitute a thin film transistor, forming a first passivation layer covering the thin film transistor, forming a black matrix on the first passivation layer, wherein the black matrix has a first opening corresponding to the pixel area and the first opening exposes the first passivation layer on portions of the drain electrode and the capacitor electrode, forming a second passivation layer on an entire surface of the substrate including the black matrix, forming a second opening, a gate pad contact hole and a data pad contact hole by patterning the second passivation layer, the first passivation layer and the gate insulating layer, wherein the second opening exposes the portions of the drain electrode and the capacitor electrode, the gate pad contact hole exposes the gate pad, and the data pad contact hole exposes the data pad, forming a first transparent conductive layer on the second passivation layer, wherein the first transparent conductive layer contacts the portions of the drain electrode and the capacitor electrode, the gate pad and the data pad, forming a color filter layer on the first transparent conductive layer in the second opening, forming a second transparent conductive layer on the color filter layer, the second transparent conductive layer contacting the first transparent conductive layer, and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

In another aspect of the present invention, a manufacturing method of a liquid crystal display device includes forming a gate line, a gate electrode and a gate pad on a substrate, forming a gate insulating layer on the gate line, the gate electrode and the gate pad, forming a semiconductor layer on the gate insulating layer over the gate electrode, forming a data line, a source electrode, a drain electrode, a capacitor electrode and a data pad, wherein the data line crosses the gate line to define a pixel area, the source and drain electrodes are disposed over the semiconductor layer spaced apart from each other, the capacitor electrode overlaps a part of the gate line, and the data pad is disposed at one end of the data line, and wherein the gate electrode, the semiconductor layer, and the source and drain electrodes constitute a thin film transistor, forming a first passivation layer covering the thin film transistor, forming a black matrix on the first passivation layer, wherein the black matrix has an opening corresponding to the pixel area and the opening exposes the first passivation layer on portions of the drain electrode and the capacitor electrode, forming a second passivation layer on an entire surface of the substrate including the black matrix, forming a drain contact hole, a capacitor contact hole, a gate pad contact hole and a data pad contact hole by patterning the second passivation layer, the first passivation layer and the gate insulating layer, wherein the drain contact hole exposes the drain electrode, the capacitor contact hole exposes the capacitor electrode, the gate pad contact hole exposes the gate pad, and the data pad contact hole exposes the data pad, forming a first transparent conductive layer on the second passivation layer, wherein the first transparent conductive layer contacts the drain electrode, the capacitor electrode, the gate pad and the data pad through the drain contact hole, the capacitor contact hole, the gate pad contact hole and the data pad contact hole, respectively, forming a color filter layer on the first transparent conductive layer in the opening, forming a second transparent conductive layer on the color filter layer, the second transparent conductive layer contacting the first transparent conductive layer, and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

In another aspect of the present invention, a liquid crystal display device having an array substrate includes a gate line and a data line on a substrate, crossing each other to define a pixel area, a thin film transistor at a crossing of the gate line and the data line, and having a gate electrode, a source electrode and a drain electrode, a gate pad at one end of the gate line and a data pad at one end of the data line, a first passivation layer covering the thin film transistor and exposing the gate pad and the data pad, a black matrix on the first passivation layer, wherein the black matrix has a first opening corresponding to the pixel area and the first opening exposes a portion of the drain electrode, a first pixel electrode on the black matrix in the pixel area, and contacting the portion of the drain electrode, a color filter layer on the first pixel electrode in the pixel area, a second pixel electrode on the color filter layer, and contacting the first pixel electrode, and a gate pad terminal contacting the gate pad and a data pad terminal contacting the data pad.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
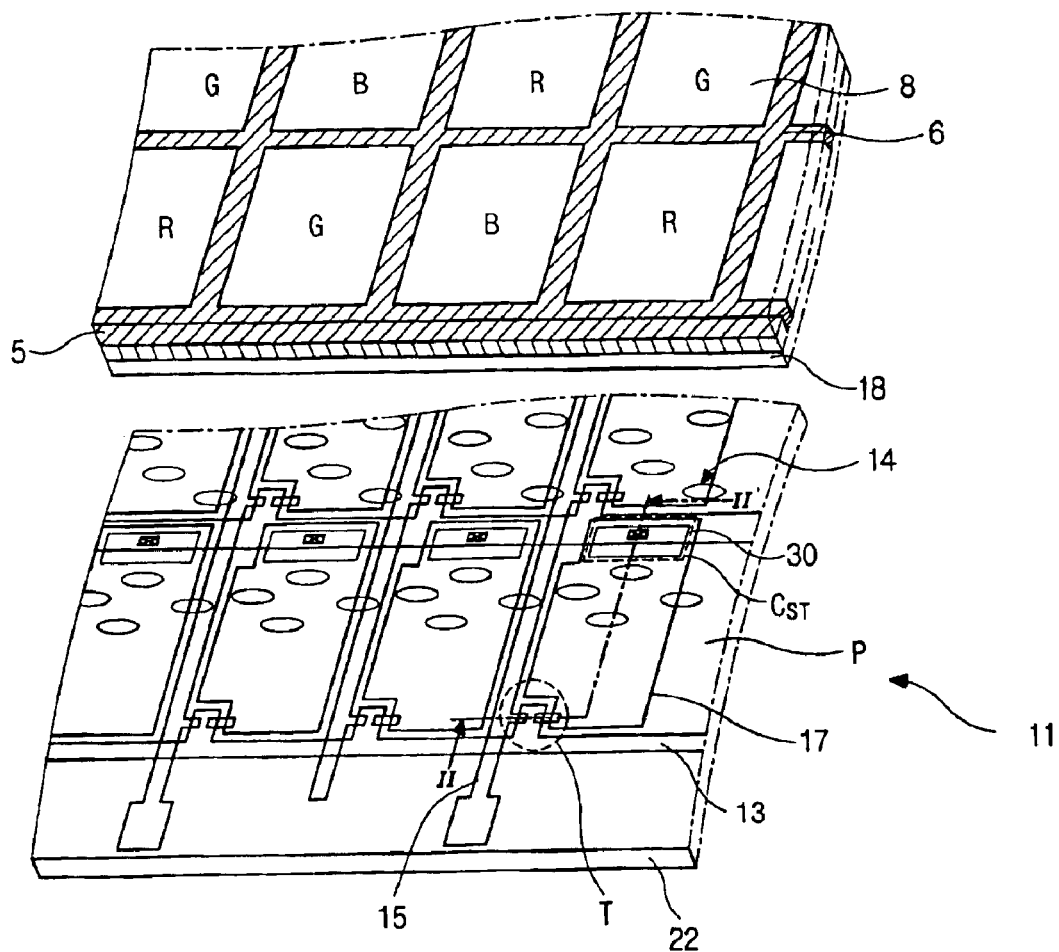
FIG. 1 is an expanded perspective view illustrating a related art liquid crystal display device.
Figure 2:
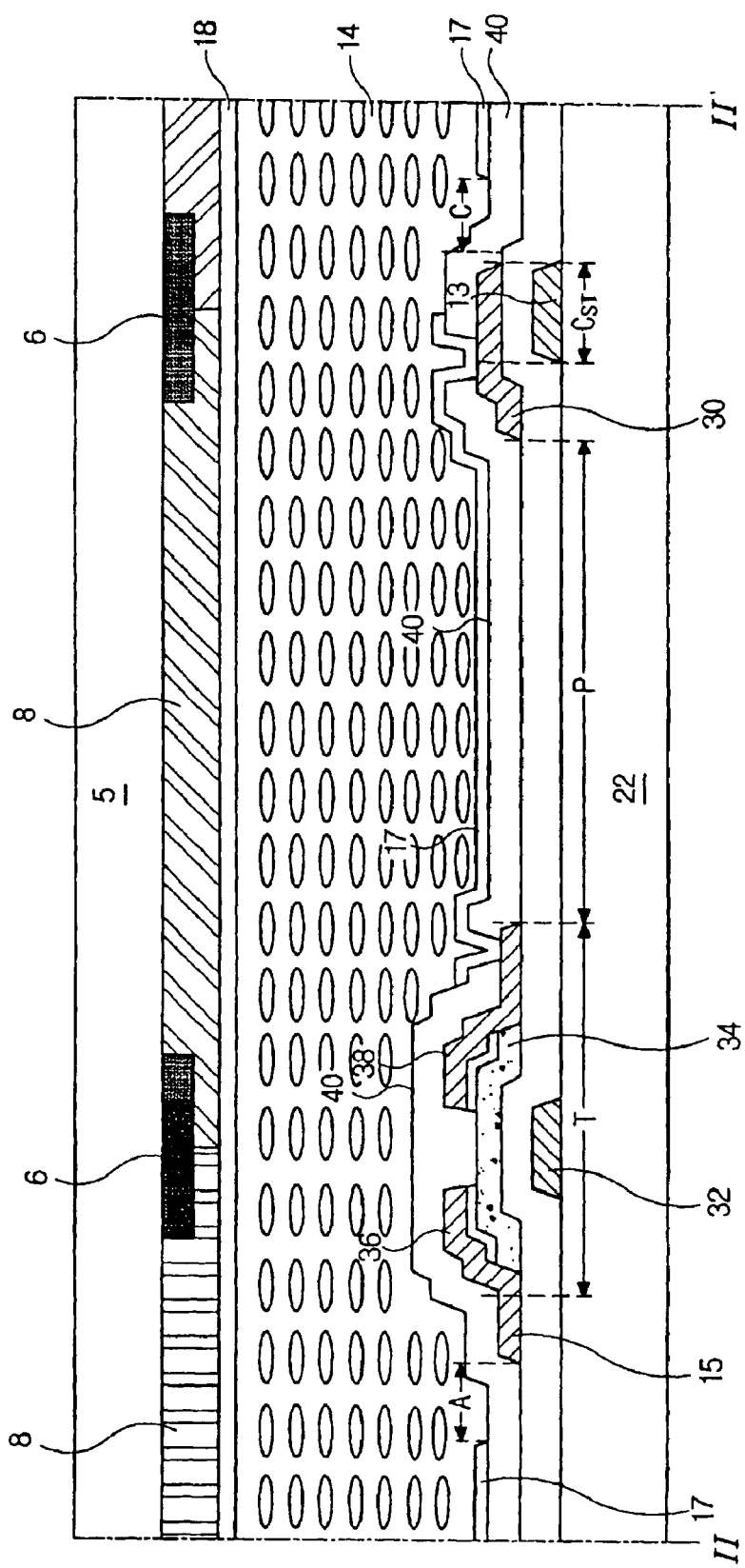
FIG. 2 is a cross-sectional view along the line II–II' of FIG. 1, illustrating a pixel of the related art liquid crystal display (LCD) device.
Figure 3:
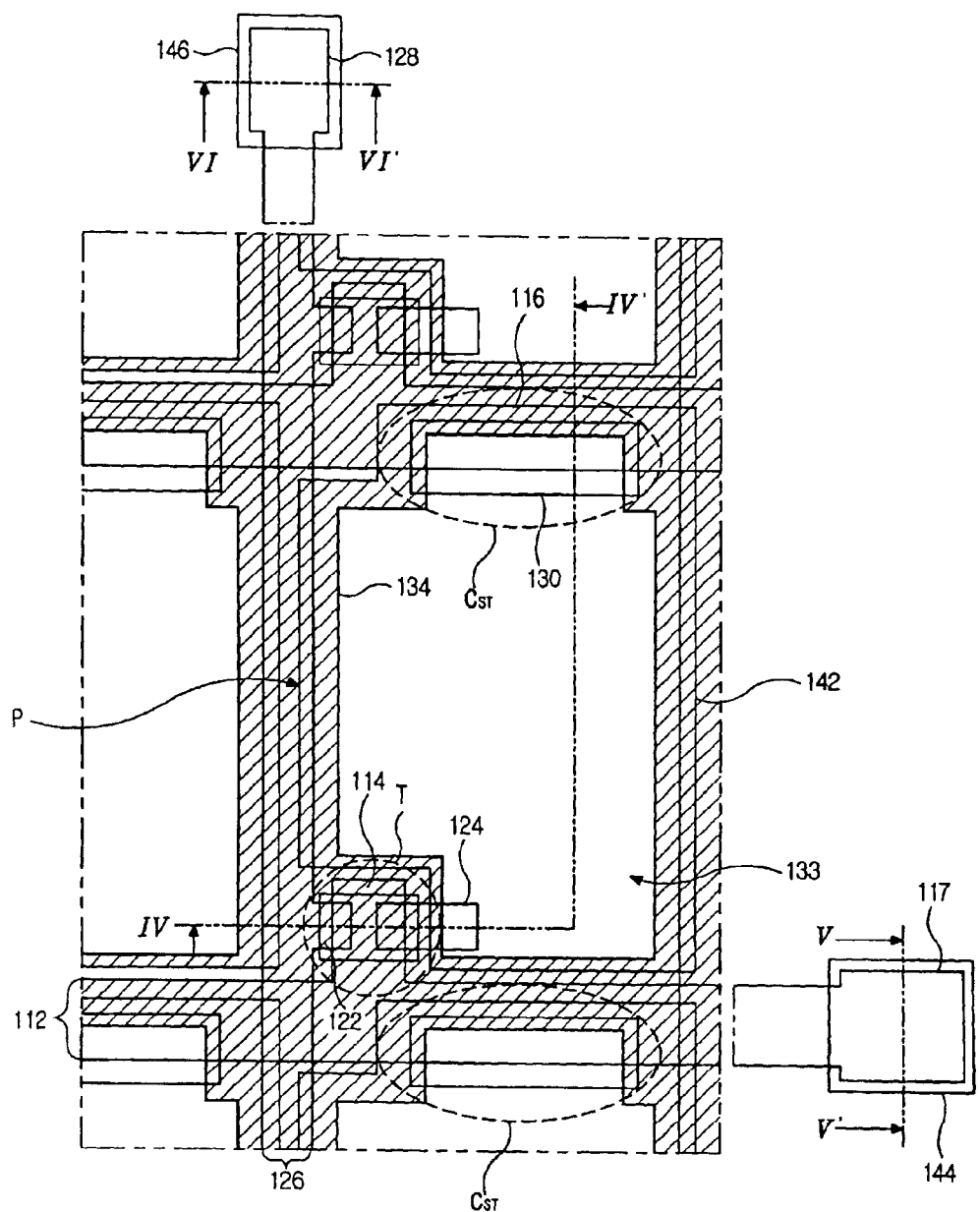
FIG. 3 is a schematic plane view of an array substrate for a liquid crystal display device according to the present invention.

FIG. 3 is a schematic plane view of a liquid crystal display device according to an embodiment of the present invention, and more particularly, illustrates an array substrate having a color filter on thin film transistor (COT) structure. As shown in FIG. 3, a gate line 112 is formed in a first direction and a data line 126 is formed in a second direction crossing the first direction. The gate line 112 and the data line 126 cross each other and define a pixel area P therebetween. A gate pad 117 is formed at one end of the gate line 112 and a data pad 128 is formed at one end of the data line 126.

A thin film transistor T is formed as a switching element adjacent to where the gate and data lines 112 and 126 cross one another. The thin film transistor T includes a gate electrode 114 that is connected to the gate line 112 for receiving scanning signals, a source electrode 122 that is connected to the data line 126 for receiving data signals, and a drain electrode 124 that is spaced apart from the source electrode 122. The drain electrode 124 can be connected to the pixel electrode 142.

A pixel electrode 142 can also be formed in the pixel area P. The pixel electrode 142 overlaps a part of the gate line 112, so that the part of the gate line 112 overlapping the pixel electrode 142 becomes a first capacitor electrode 116. A second capacitor electrode 130 that is made of the same material as the data line 126 is formed over the first capacitor electrode 116, and is electrically connected to the pixel electrode 142. The first and second capacitor electrodes 116 and 130 form a storage capacitor $C_{ST}$.

A black matrix 134, which is denoted by a hatched region in FIG. 3, is formed corresponding to the gate line 112, the data line 126, the thin film transistor T and edges of the pixel electrode 142. The black matrix 134 has an opening 133 corresponding to the pixel region P. The opening 133 exposes parts of the second capacitor electrode 130 and the drain electrode 124. Thus, the pixel electrode 142 can directly contact the drain electrode 124 and the second capacitor electrode 130 without contact holes. A gate pad terminal 144 and a data pad terminal 146 are formed on the gate pad 117 and the data pad 128, respectively. The gate pad terminal 144 and the data pad terminal 146 may be made of the same material as the pixel electrode 142. Although not shown in FIG. 3, a color filter layer is formed corresponding the opening 133 of the black matrix 134.

The LCD device in this embodiment includes an array substrate having a color filter on thin film transistor (COT) structure. In such a COT structure, since a black matrix 120 and the color filters not correct are formed on the same substrate with the pixel electrode 142, an alignment margin between the black matrix 134 and the pixel electrode 142 is minimized. Hereinafter, manufacturing processes of the array substrate for the LCD of the COT structure will be explained in detail with reference to FIGS. 4A to 4I, FIGS. 5A to 5I, and FIGS. 6A to 6I.

FIGS. 4A to 4I, FIGS. 5A to 5I, and FIGS. 6A to 6I are cross-sectional views illustrating process steps of manufacturing an array substrate according to a first embodiment of the presenting invention. FIGS. 4A to 4I correspond to cross-sections along the line IV–IV' of FIG. 3, FIGS. 5A to 5I correspond to cross-sections along the line V–V' of FIG. 3, and FIGS. 6A to 6I correspond to cross-sections along the line VI–VI' of FIG. 3.

Figure 4A:
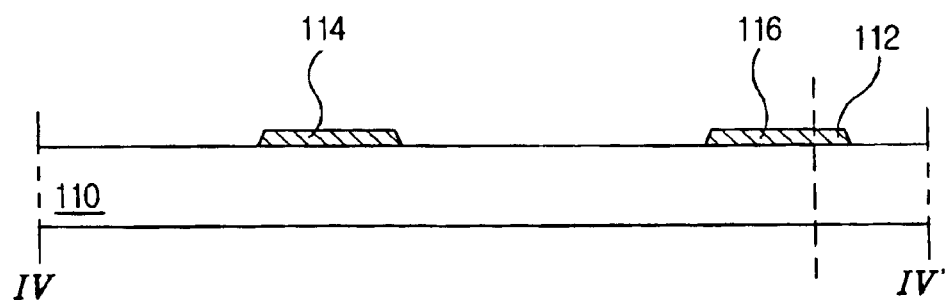
FIGS. 4A to 4I are cross-sectional views along the line IV–IV' of FIG. 3, illustrating process steps of manufacturing an array substrate according to a first embodiment of the presenting invention.
Figure 5A:
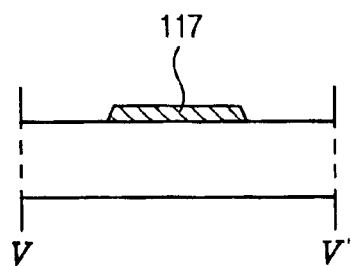
FIGS. 5A to 5I are cross-sectional views along the line V–V' of FIG. 3, illustrating process steps of manufacturing an array substrate according to a first embodiment of the presenting invention.
Figure 6A:
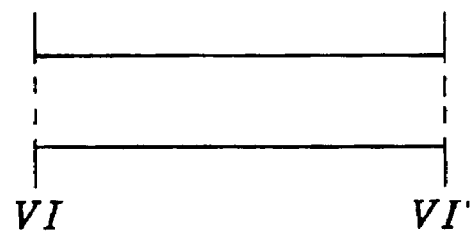
FIGS. 6A to 6I are cross-sectional views along the line VI–VI' of FIG. 3, illustrating process steps of manufacturing an array substrate according to a first embodiment of the presenting invention.

Referring to FIGS. 4A, 5A and 6A, a gate electrode 114, a gate line 112 and a gate pad 117 are formed on a substrate 110 by depositing a first metal material and then patterning it through a first mask process, which is a photolithography process including the steps of light-exposing and developing photosensitive material. A part of the gate line 112 functions as a first capacitor electrode 116. The gate electrode 114 extends from the gate line 112 while the gate pad 117 is situated at one end of the gate line 112.

Figure 4B:
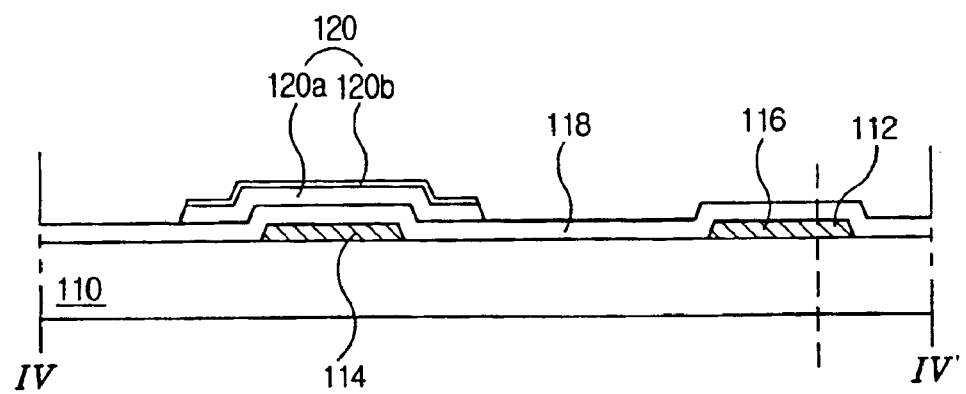
Figure 5B:
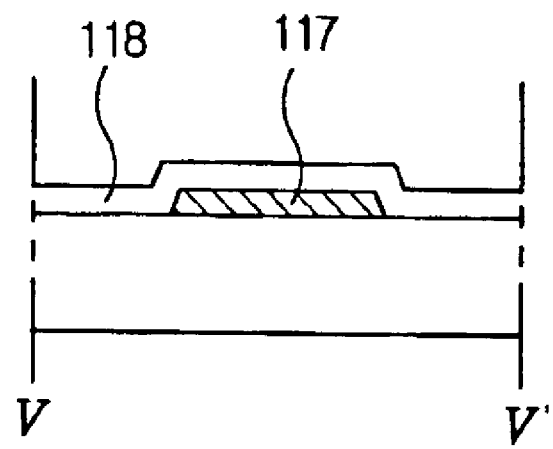
Figure 6B:
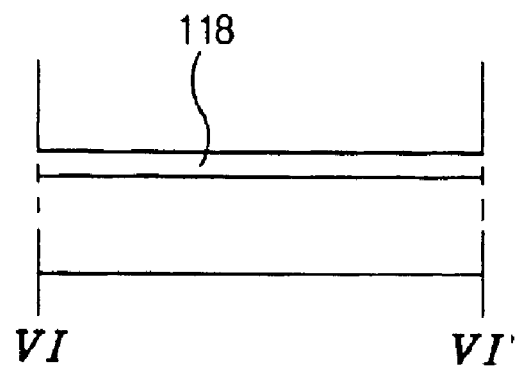

Referring to FIGS. 4B, 5B and 6B, a gate insulating layer 118, an active layer 120a and an ohmic contact layer 120b are formed by subsequently depositing first insulating material, amorphous silicon and doped amorphous silicon over the substrate 110, including the gate line 112, the gate electrode 114 and the gate pad 110. The doped amorphous silicon and the amorphous silicon are patterned through a second mask process. The active layer 120a and the ohmic contact layer 120b are disposed over the gate electrode 114, and constitute a semiconductor layer 120.

Figure 4C:
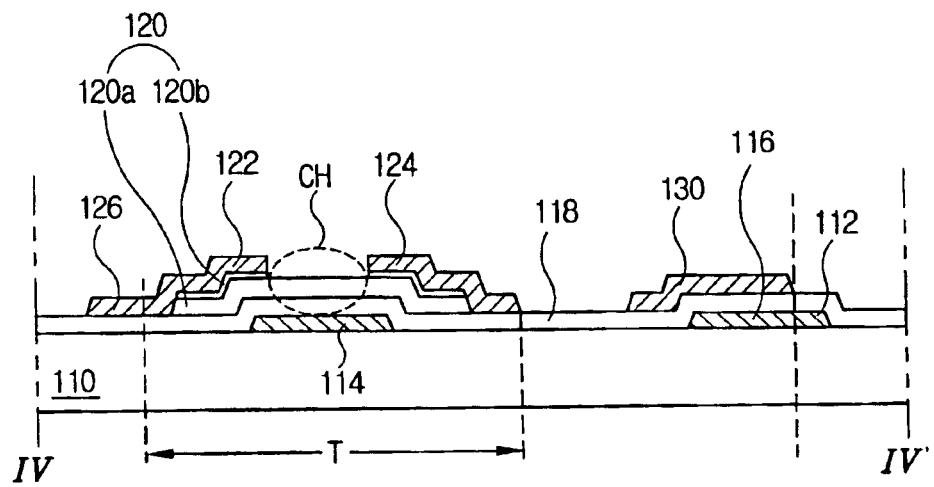
Figure 5C:
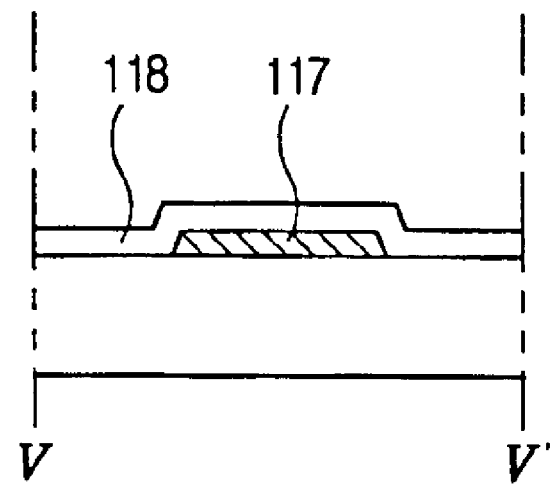
Figure 6C:
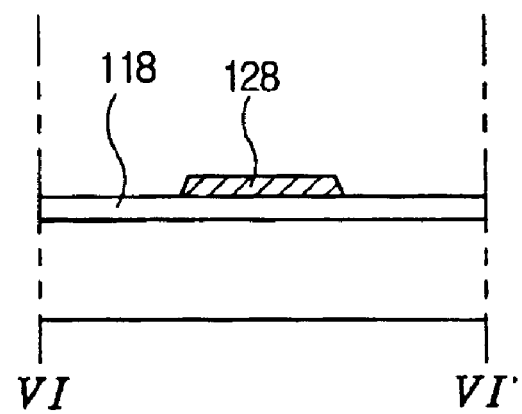

Referring to FIGS. 4C, 5C and 6C, a source electrode 122, a drain electrode 124, a data line 126 are formed by depositing a second metal material and patterning it through a third mask process. The source and drain electrodes 122 and 124 are disposed over the semiconductor layer 120 spacing each other. The data line 126 is connected to the source electrode 122 and crosses the gate line 112. At the same time, a data pad 128 and a second capacitor electrode 130 are formed on the gate insulating layer 118. The data pad 128 is situated at one end of the data line 126. The second capacitor electrode 130 of an island shape is disposed over the first capacitor electrode 116. The gate electrode 114, the semiconductor, the source electrode 122 and the drain electrode 125 form parts of a thin film transistor T. The gate pad 117 and the data pad 128 are disposed in a non-image area where images are not displayed.

Next, a portion of the ohmic contact layer 120b exposed between the source electrode 122 and the drain electrode 124 is removed by using the source and drain electrodes 122 and 124 as an etch mask to expose a part of the active layer 120a. The part of the active layer 120a exposed between the source electrode 122 and the drain electrode 124 becomes a channel CH of the thin film transistor T.

Figure 4D:
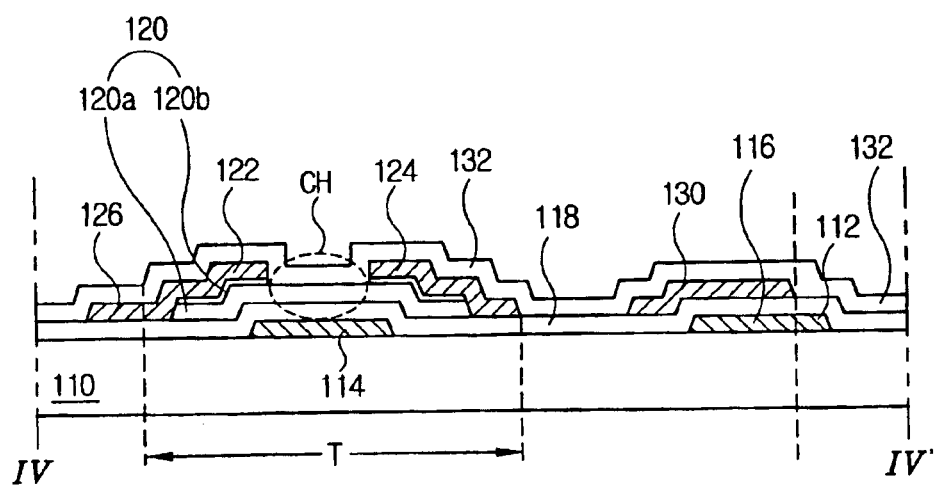
Figure 5D:
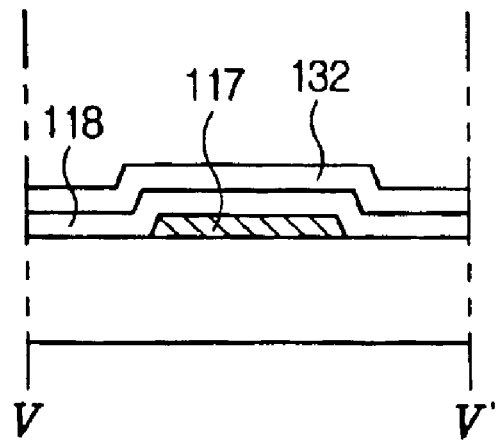
Figure 6D:
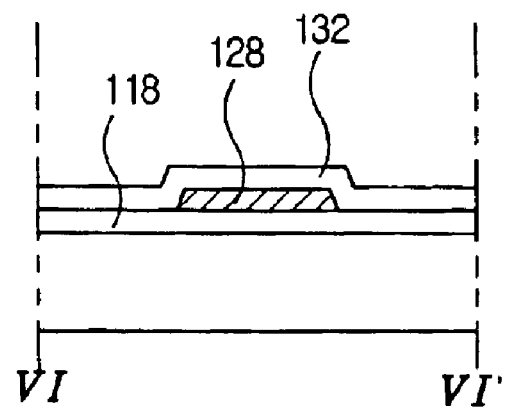

Referring to FIGS. 4D, 5D and 6D, a passivation layer 132 is formed on the source and drain electrodes 122 and 124, the data line 126 and the second capacitor electrode 130 by using a second insulating material. The passivation layer 132 prevents poor contacts, which may occur between the thin film transistor T and a black matrix, which is formed later. Preferably, the passivation layer 132 can be made of an inorganic material, and more preferably, the passivation layer 132 is made of silicon nitride (SiNx).

Figure 4E:
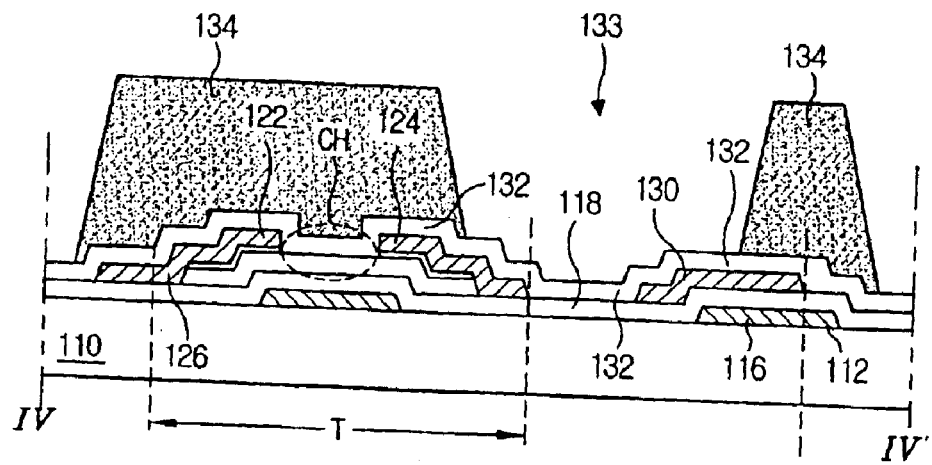
Figure 5E:
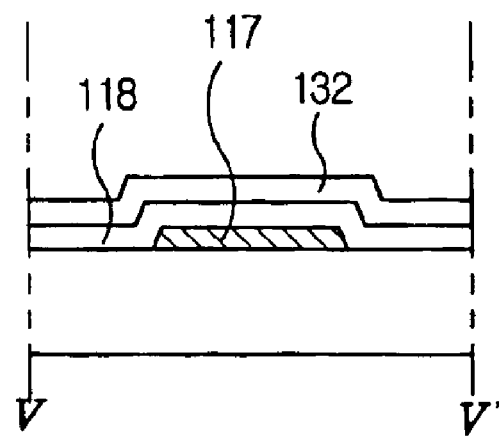
Figure 6E:
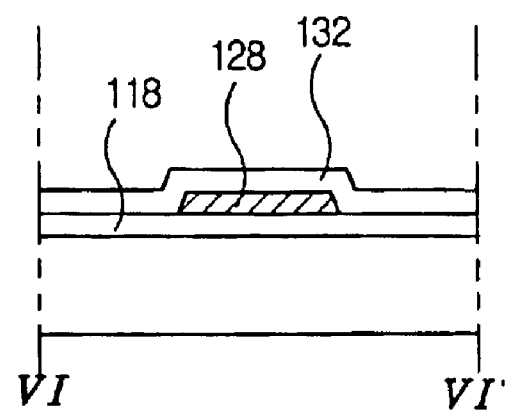

Referring to FIGS. 4E, 5E and 6E, a black matrix 134 can be formed on the passivation layer 132 by forming a light-blocking material and patterning it through a fourth mask process. Except for the gate pad 117, the black matrix 134 covers the gate line 112. Except for the data pad 128 and the thin film transistor T, the data line 126 and has an opening 133 corresponding to a pixel area. The black matrix 134 can be made of an opaque organic material. The black matrix 134 not only blocks light but also protects the thin film transistor T. The opening 133 also exposes the passivation layer 132 on portions of the drain electrode 124 and the second capacitor electrode 130.

Figure 4F:
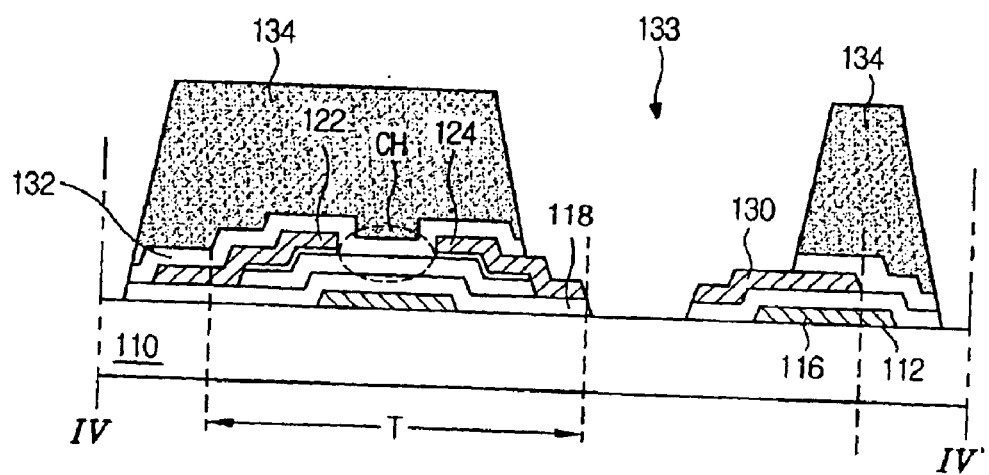
Figure 5F:
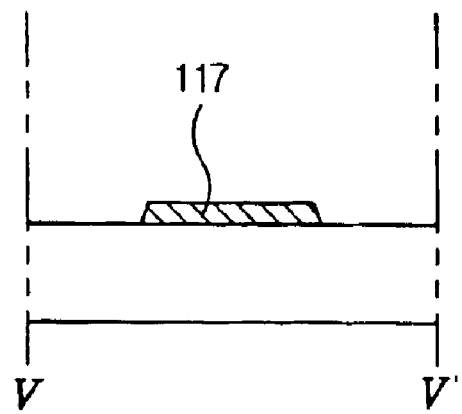
Figure 6F:
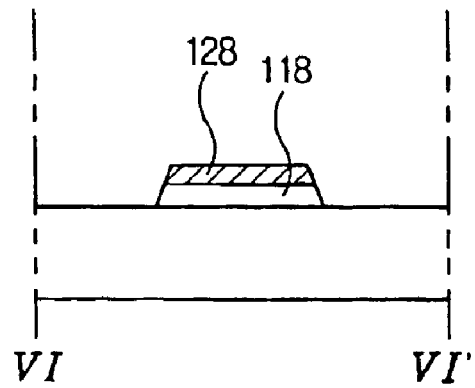

Referring to FIGS. 4F, 5F and 6F, the passivation layer 132 and the gate insulating layer 118 are etched by using the black matrix 134 as an etch mask. At this time, the data pad 128 and the portions of the drain electrode 124 and the second capacitor electrode 130, which are uncovered with the black matrix 134, also function as an etch mask. Thus the gate insulating layer 118 under the data pad 128 and the portions of the drain electrode 124 and the second capacitor electrode 130 are not etched. Therefore, the substrate 110, the gate pad 117, the data pad 128, and the portions of the drain electrode 124 and the second capacitor electrode 130 are exposed.

Figure 4G:
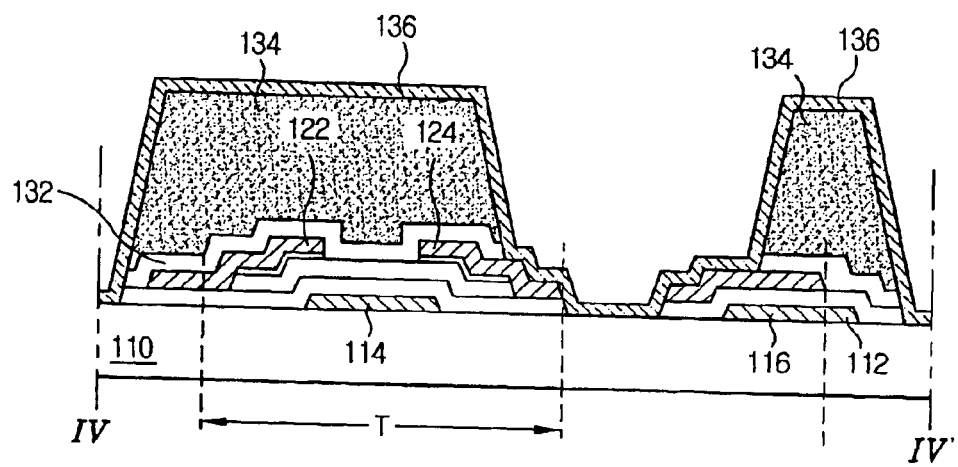
Figure 5G:
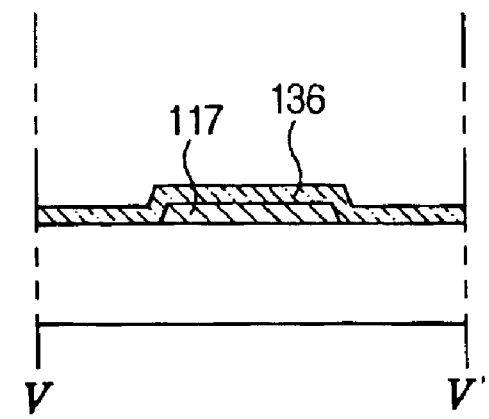
Figure 6G:
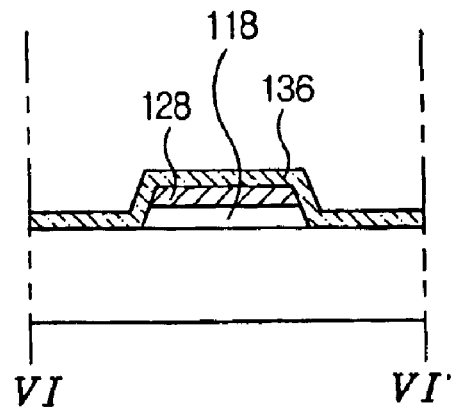

Referring to FIGS. 4G, 5G and 6G, a first transparent conductive layer 136 is formed over an entire surface of the substrate 110 including the black matrix 134 thereon. The first transparent conductive layer 136 contacts the exposed portions of the drain electrode 124 and the second capacitor electrode 130. Moreover, the first transparent conductive layer 136 contacts the gate pad 117, the data pad 128, and the exposed substrate 110. The first transparent conductive layer 136 is also formed along the sidewalls of the black matrix 134. The first transparent conductive layer 136 prevents an etchant for etching a color filter, which will be formed later, from penetrating into the gate insulating layer 118 and thus damaging the gate line 112 and the gate electrode 114.

Figure 4H:
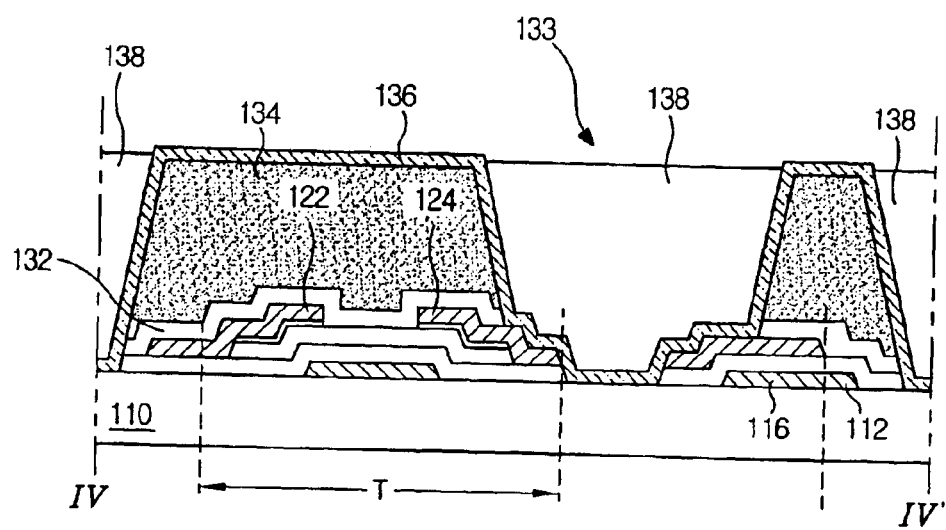
Figure 5H:
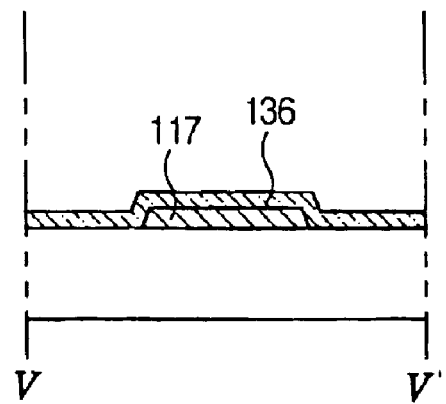
Figure 6H:
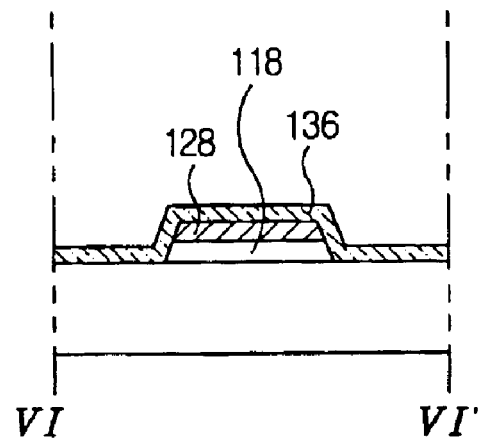

Referring to FIGS. 4H, 5H and 6H, a color filter layer 138 is formed on the first transparent conductive layer 136 in the opening 133 of the black matrix 134. The color filter layer 138 includes three color filters of red, green and blue, which are formed using fifth, sixth and seventh mask processes, respectively.

Figure 4I:
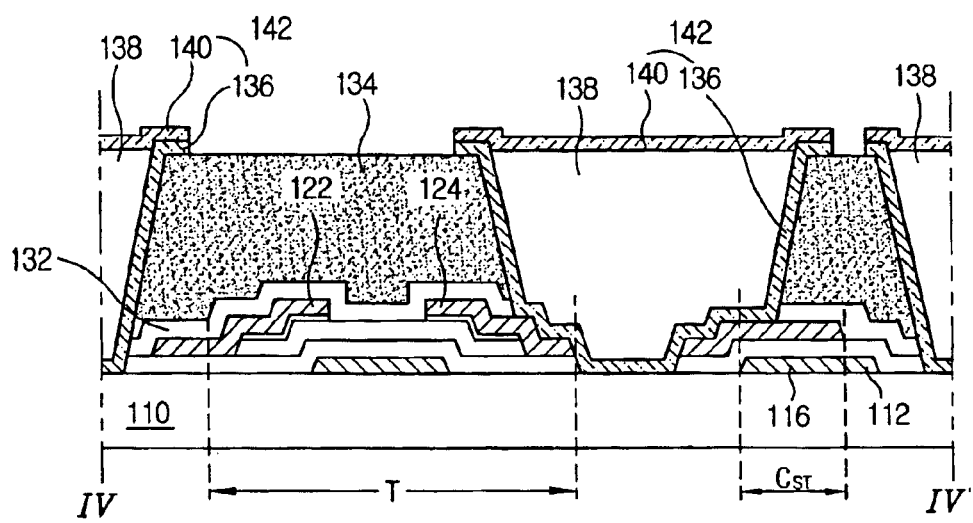
Figure 5I:
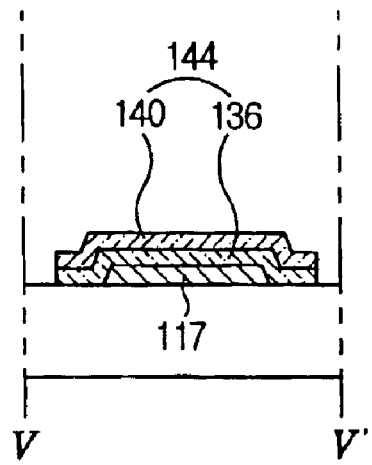
Figure 6I:
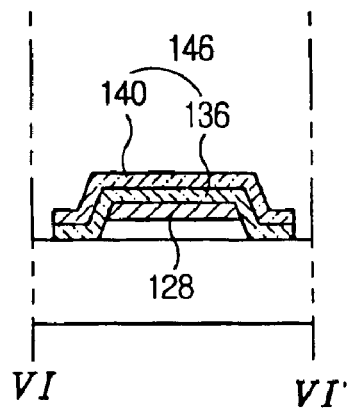

Referring to FIGS. 4I, 5I and 6I, a second transparent conductive layer 140 is formed on the color filter layer 138 and then is patterned with the first transparent conductive layer 136 through an eighth mask process to form a pixel electrode 142, a gate pad terminal 144 and a data pad terminal 146, each of which includes the first and second transparent conductive layers 136 and 140. The pixel electrode 142 is disposed in the pixel area and is connected to the drain electrode 124 and the second capacitor electrode 130. The gate pad terminal 144 contacts the gate pad 117 and the data pad terminal 146 contacts the data pad 128. The first and second capacitor electrodes 116 and 130 form a storage capacitor $C_{ST}$.

FIGS. 7A to 7F, FIGS. 8A to 8F and FIGS. 9A to 9F are cross-sectional views illustrating process steps of manufacturing an array substrate according to a second embodiment of the presenting invention, and uses some of the same steps as discussed in reference to FIGS. 4A to 4D, FIGS. 5A to 5D and FIGS. 6A to 6D. Thus, explanation for the steps that are also used in FIGS. 4A to 4D, FIGS. 5A to 5D and FIGS. 6A to 6D will be omitted, and the number of mask processes will also not be mentioned. Wherever possible, the same reference numbers will be used throughout the drawings to refer to the same or like parts.

Figure 7A:
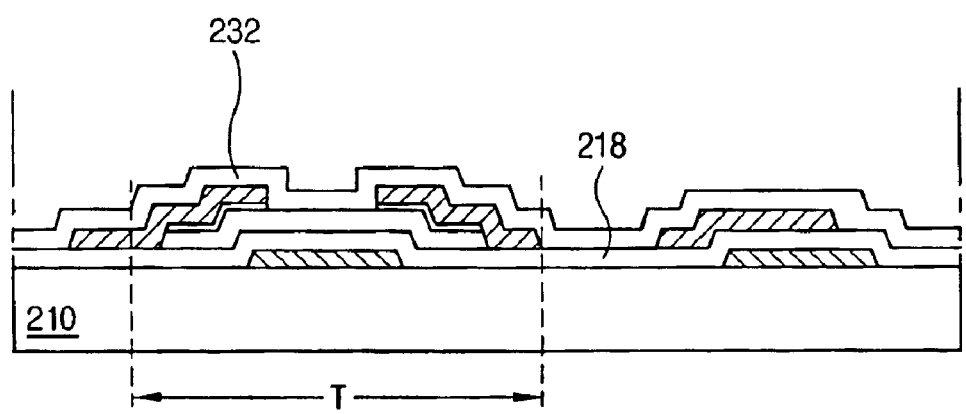
FIGS. 7A to 7F, FIGS. 8A to 8F and FIGS. 9A to 9F are cross-sectional views illustrating process steps of manufacturing an array substrate according to a second embodiment of the presenting invention.
Figure 8A:
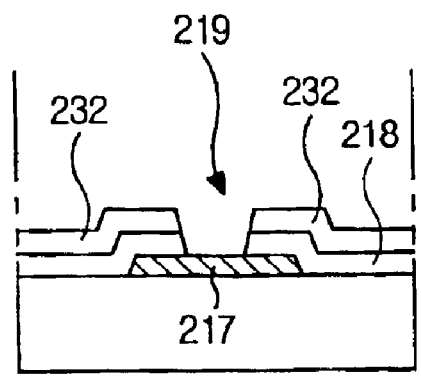
Figure 9A:
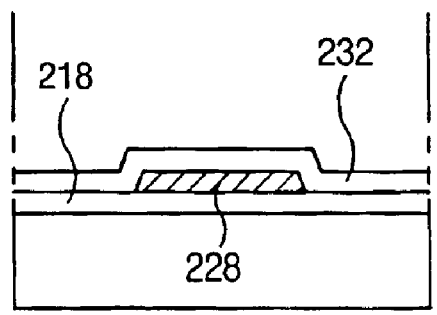

Referring to FIGS. 7A, 8A and 9A, after the passivation layer 232 is formed in the steps described with regard to FIGS. 4A to 4D, FIGS. 5A to 5D and FIGS. 6A to 6D of FIGS. 4D, 5D and 6D, a gate pad contact hole 219 exposing the gate pad 217 is formed in the passivation layer 232 and gate insulating layer 218 by removing the passivation layer 232 and gate insulating layer 218 over the gate pad 217.

Figure 7B:
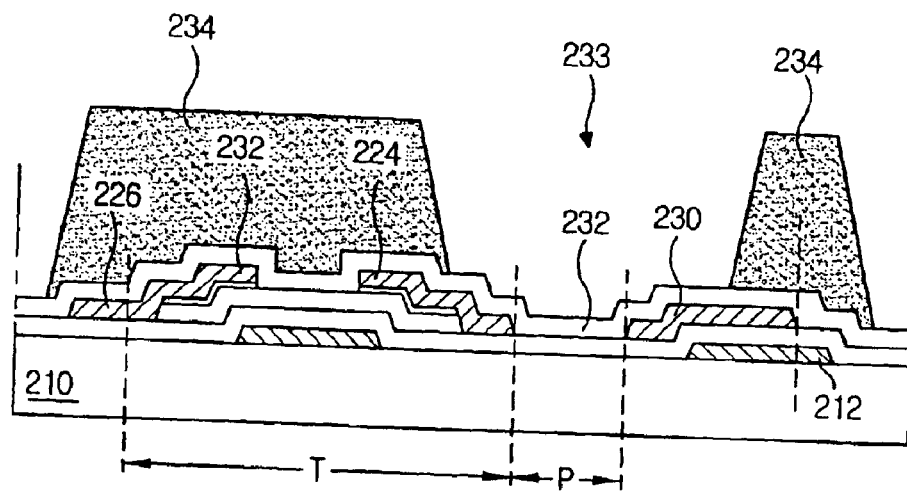
Figure 8B:
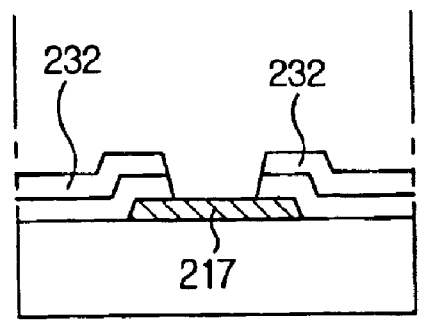
Figure 9B:
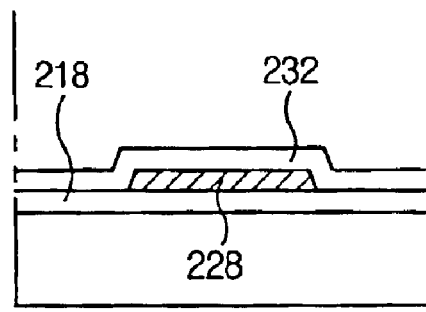

Referring to FIGS. 7B, 8B and 9B, a black matrix 234 is formed on the passivation layer 232 by forming a light-blocking material and patterning it. The black matrix 234 covers the gate line 212 except for the gate pad 217, the data line 226 except for the data pad 228 and the thin film transistor T, and has an opening 233 corresponding to a pixel area P. The opening 233 exposes the passivation layer 232 on portions of the drain electrode 224 and the second capacitor electrode 230.

Figure 7C:
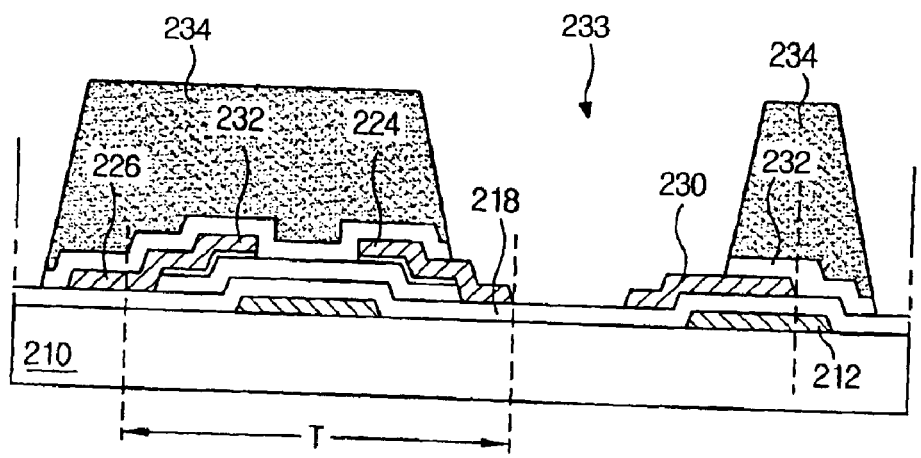
Figure 8C:
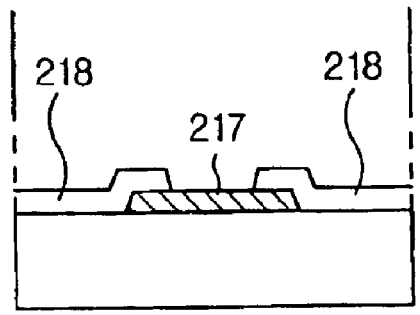
Figure 9C:
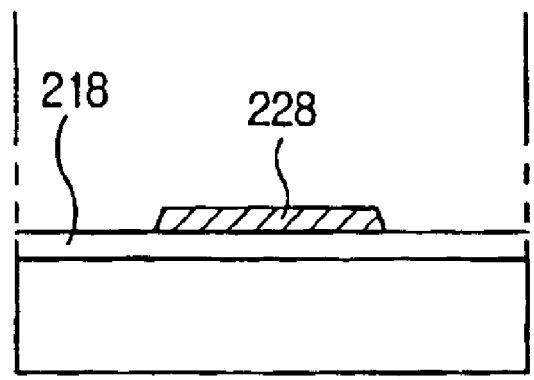

Referring to FIGS. 7C, 8C and 9C, the passivation layer 232 is etched by using the black matrix 234 as an etch mask. At this time, in order to selectively remove only the passivation layer 232, it is important that etching selectivity of the passivation layer 232 and the gate insulating layer 218 is controlled. For example, even though the gate insulating layer 218 and the passivation layer 232 may be made of the same material, the passivation layer 232 is formed under lower temperature than the gate insulating layer 218. Then, since the passivation layer 232 is etched faster than the gate insulating layer 218, the passivation layer 232 can be selectively etched. Meanwhile, if the insulating layers are formed of different materials, for example, a layered structure of SiNx/SiOx, SiNx/AlOx, SiNx/TaOx, or SiNx/TiOx, the insulating layers may have the same shape as the first embodiment, or a part of the layered materials can remain. Accordingly, the data pad 228, the portions of the drain electrode 224 and the second capacitor electrode 230, and the gate insulating layer 218 are exposed.

Figure 7D:
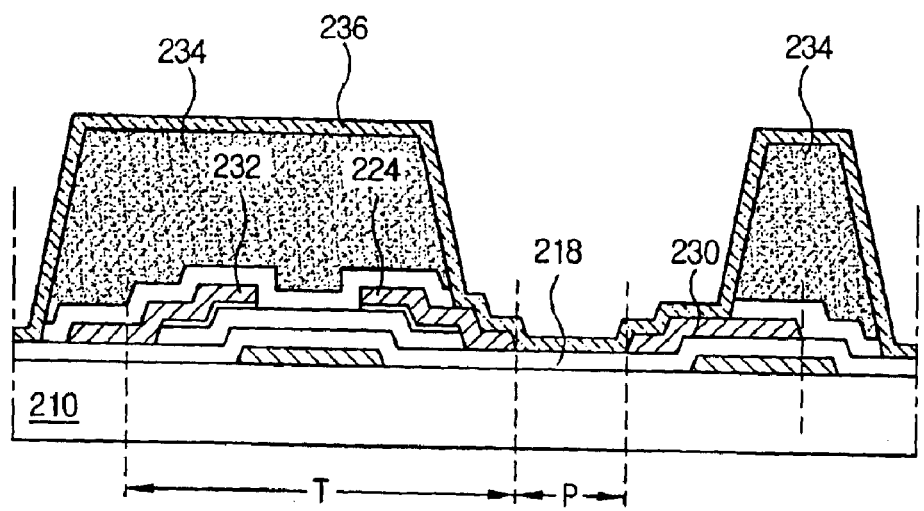
Figure 8D:
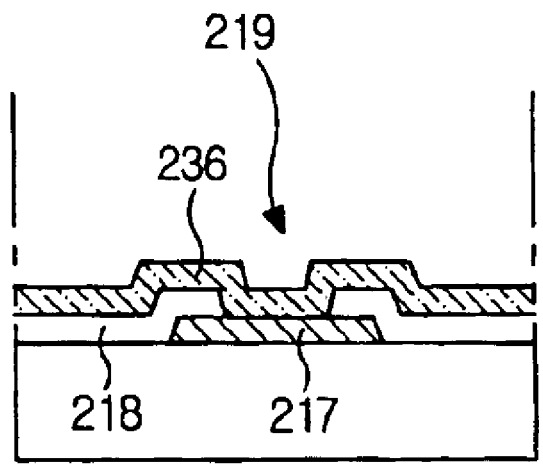
Figure 9D:
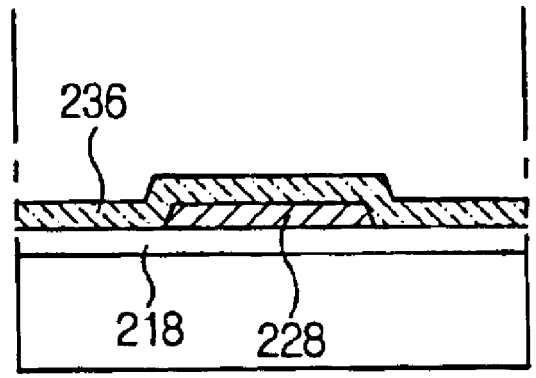

Referring to FIGS. 7D, 8D and 9D, a first transparent conductive layer 236 is formed on an entire surface of the substrate 210 including the black matrix 234 thereon. The first transparent conductive layer 236 contacts the exposed portions of the drain electrode 224 and the second capacitor electrode 230 and the data pad 228. Also, the first transparent conductive layer 236 contacts the gate pad 217 through the gate pad contact hole 219. The first transparent conductive layer 236 is disposed on the gate insulating layer 218 in the pixel area P. Here, the first transparent conductive layer 236 is formed along the sidewalls of the black matrix 234.

Figure 7E:
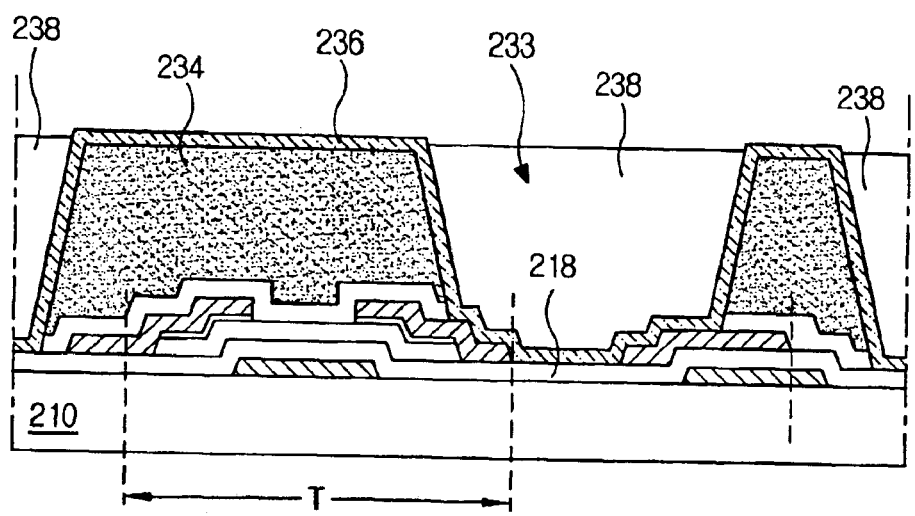
Figure 8E:
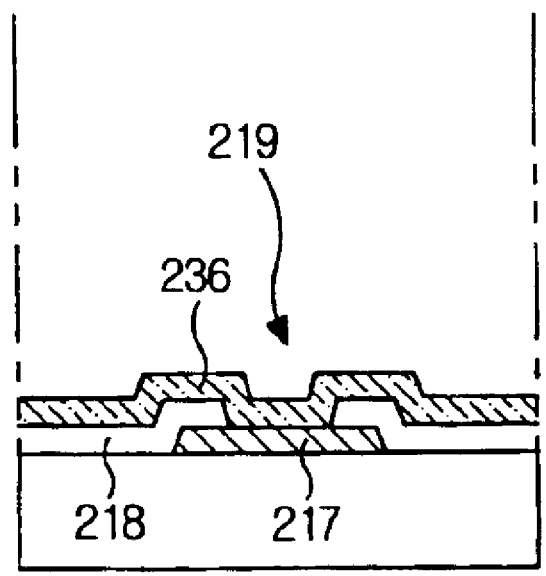
Figure 9E:
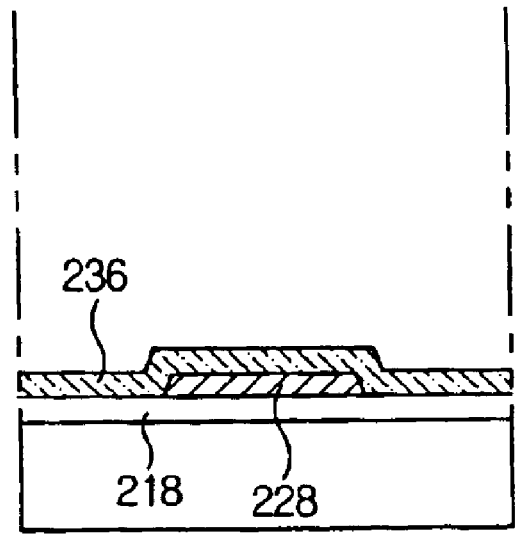

Referring to FIGS. 7E, 8E and 9E, a color filter layer 238 is formed on the first transparent conductive layer 236 in the opening 233 of the black matrix 234. The color filter layer 238 includes three color filters of red, green and blue. The black matrix 234 becomes a border between the color filters.

Figure 7F:
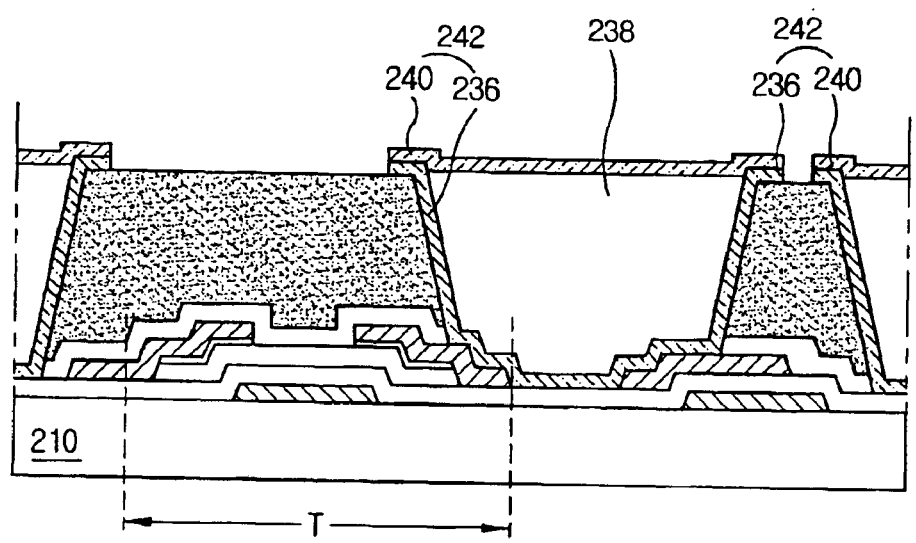
Figure 8F:
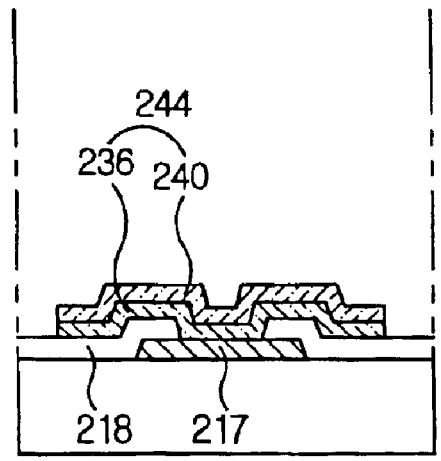
Figure 9F:
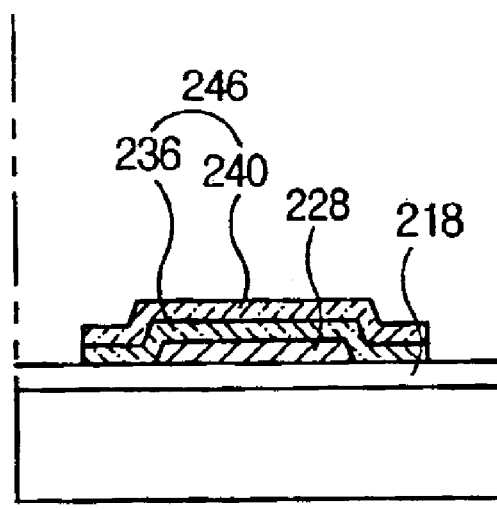

Referring to FIGS. 7F, 8F and 9F, a second transparent conductive layer 240 is formed on the color filter layer 238 and then is patterned with the first transparent conductive layer 236 to form a pixel electrode 242, a gate pad terminal 244 and a data pad terminal 246, each of which includes the first and second transparent conductive layers 236 and 240. The pixel electrode 242 is disposed in the pixel area P and is connected to the drain electrode 224 and the second capacitor electrode 230. The gate pad terminal 244 is disposed on and contacts the gate pad 217, and the data pad terminal 246 is disposed on and contacts the data pad 228.

In the first and second embodiments of the present invention, since the first transparent conductive layer is formed on and contacts the black matrix, the black matrix may be thermally oxidized during the process of forming the first transparent conductive layer. To prevent this problem, another passivation layer can be formed between the black matrix and the first transparent conductive layer.

FIGS. 10A to 10E, FIGS. 11A to 11E and FIGS. 12A to 12E are cross-sectional views illustrating process steps of manufacturing an array substrate according to a third embodiment of the presenting invention, and follow the steps discussed in reference to FIGS. 4A to 4D, FIGS. 5A to 5D and FIGS. 6A to 6D. Thus, explanation for the steps of FIGS. 4A to 4D, FIGS. 5A to 5D and FIGS. 6A to 6D will be omitted, and the number of mask processes will also not be mentioned. Wherever possible, the same reference numbers will be used throughout the drawings to refer to the same or like parts.

Figure 10A:
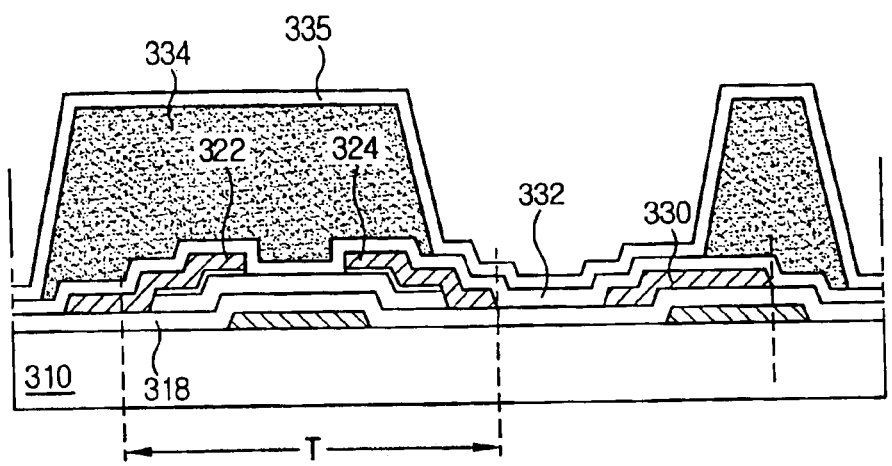
FIGS. 10A to 10E, FIGS. 11A to 11E and FIGS. 12A to 12E are cross-sectional views illustrating process steps of manufacturing an array substrate according to a third embodiment of the presenting invention.
Figure 11A:
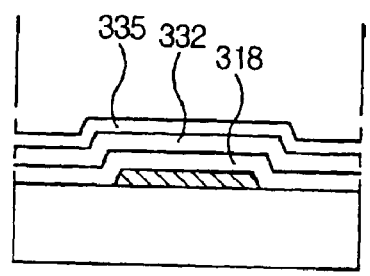
Figure 12A:
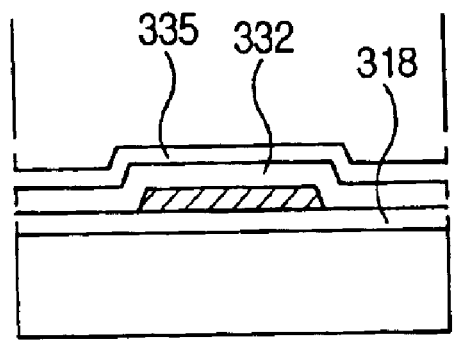

Referring to FIGS. 10A, 11A and 12A, after a first passivation layer 332, which is referred to as a passivation layer 132 in FIGS. 4D, 5D and 6D, is formed in the step of FIGS. 4D, 5D and 6D, a black matrix 334 is formed on the first passivation layer 332 by forming a light-blocking material and patterning it. Next, a second passivation layer 335 is formed on an entire surface of the substrate 310 including the black matrix 334. As stated above, the second passivation layer 335 can prevent thermal oxidization of the black matrix 334.

To prevent oxidation of the black matrix, the second passivation layer 335 can be made of silicon nitride (SiNx)

by a plasma enhanced chemical vapor deposition (PECVD) method that can form a thin film under low temperatures. In the alternative, the second passivation layer 335 can be made of one of silicon nitride (SiNx), silicon oxide (SiOx) and silicon oxynitride (SiOxNy) by a sputtering method. Since temperatures should be raised if silicon oxide (SiOx) and silicon oxynitride (SiOxNy) may be formed by the PECVD method, it is preferable that the silicon oxide (SiOx) and silicon oxynitride (SiOxNy) be formed by the sputtering method. In another alternative, the second passivation layer 335 can be made of one of oxynitride (OxNy) and nitride (Nx) including carbon (C), which can be formed by the PECVD method using 3MS(3-methoxy silane) as a reaction gas. Additionally, it is preferable that the second passivation layer 335 has a thickness less than 3,000 Å in order to prevent peeling or deformation by outer stress. More preferably, the second passivation layer 335 may have a thickness within a range of about 500 Å to about 3,000 Å.

Among the passivation materials, silicon nitride can be densely formed by controlling reaction gases and electrical power. Densely formed silicon nitride prevents various solvents from penetrating under layers during processing. Silicon nitride is preferably formed under lower temperatures than before by adding hydrogen ($H_2$) or helium (He) into silane($SiH_4$)/ammonia($NH_3$)/nitrogen($N_2$), which are commonly used as reaction gases. The black matrix 334 can also be at lower temperatures, such as less than about 250 degrees Celsius, to improve thermal stability of a black matrix material.

Figure 10B:
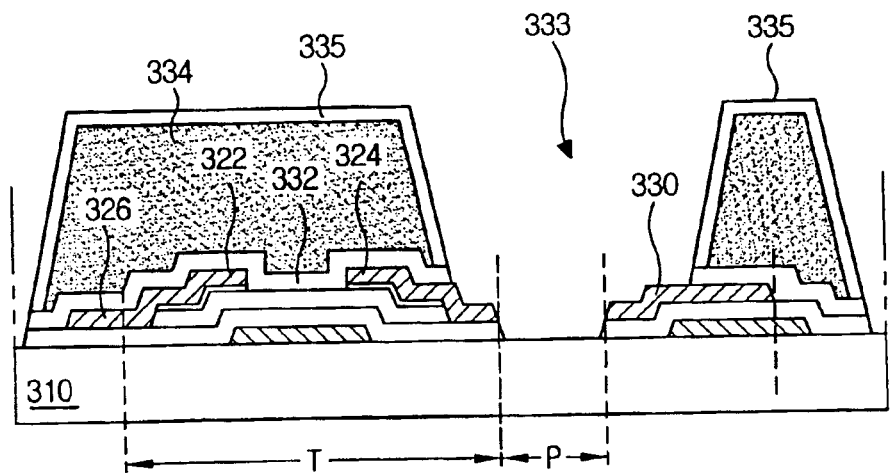
Figure 11B:
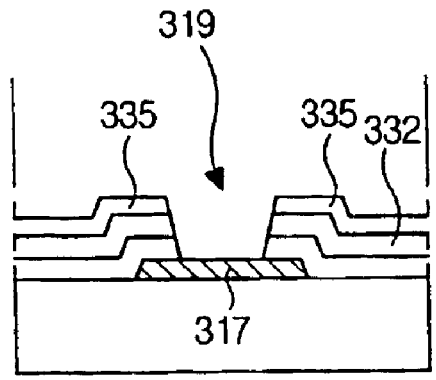
Figure 12B:
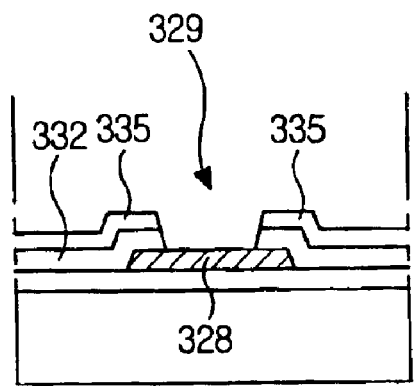

Referring to FIGS. 10B, 11B and 12B, an opening 333, a gate pad contact hole 319 and a data pad contact hole 329 are formed by patterning the second passivation layer 335, the first passivation layer 332 and the gate insulating layer 318 through a mask process. Here, portions of the drain electrode 324 and the second capacitor electrode 330 and the data pad 328 function as an etch mask, and thus the gate insulating layer 318 under the portions of the drain electrode 324 and the second capacitor electrode 330 and the data pad 328 is not etched. The opening 333 exposes the substrate 310 and the portions of the drain electrode 324 and the second capacitor electrode 330 in the pixel area P. The gate pad contact hole 319 exposes the gate pad 317 and the data pad contact hole 329 exposes the data pad 328.

Figure 10C:
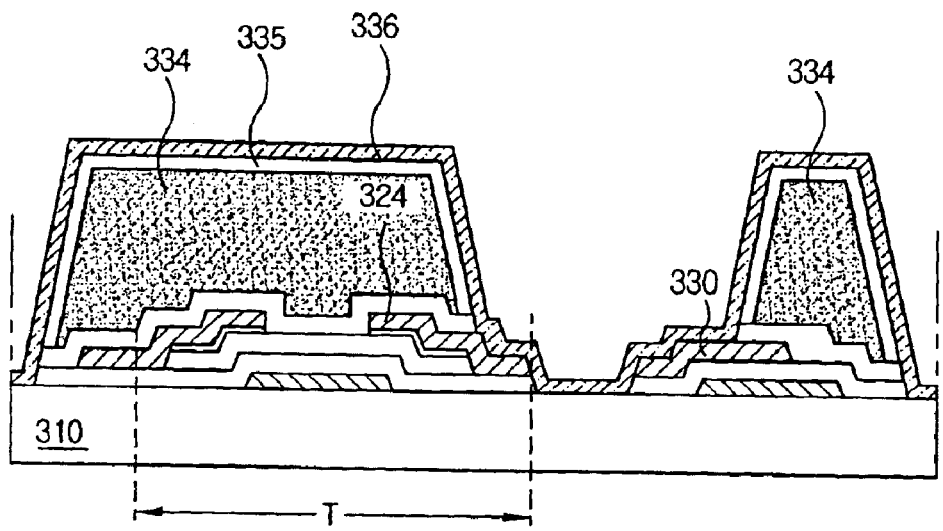
Figure 11C:
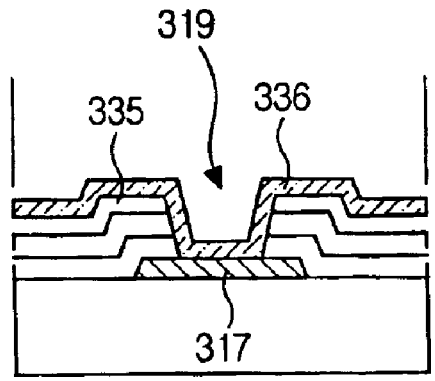
Figure 12C:
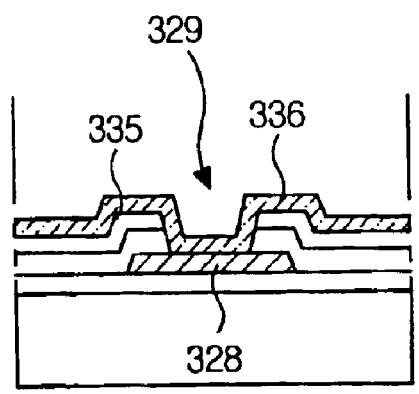

Referring to FIGS. 10C, 11C and 12C, a first transparent conductive layer 336 is formed over an entire surface of the substrate 310 including the second passivation layer 335 thereon. The first transparent conductive layer 336 contacts the exposed portions of the drain electrode 324 and the second capacitor electrode 330 but not through contact holes. Also, the first transparent conductive layer 336 contacts the gate pad 317 via the gate pad contact hole 319 and contacts the data pad 328 via the data pad contact hole 329. Here, the first transparent conductive layer 336 is formed along the sidewalls of the black matrix 334.

Figure 10D:
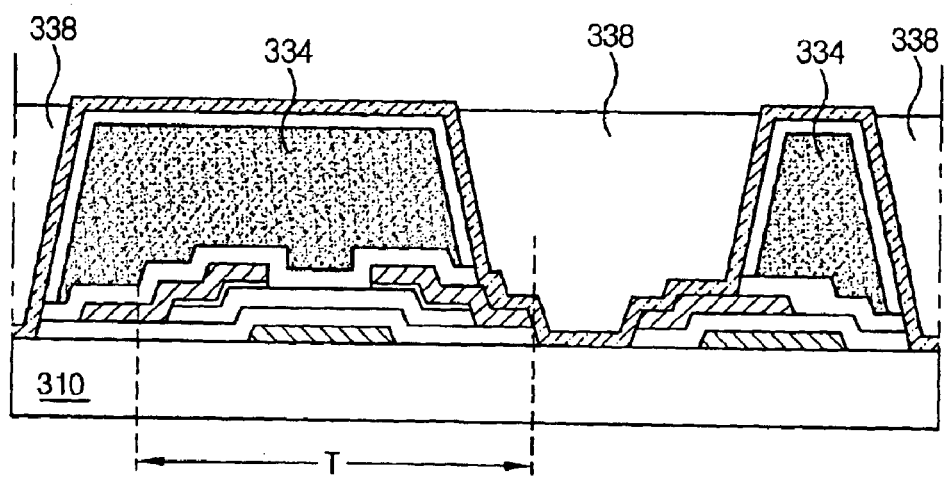
Figure 11D:
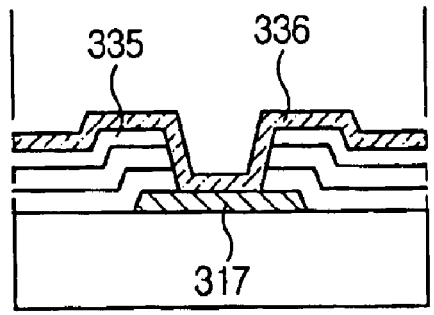
Figure 12D:
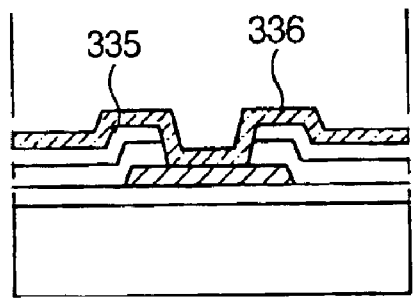

Referring to FIGS. 10D, 11D and 12D, a color filter layer 338 is formed on the first transparent conductive layer 336 in the opening 333. The color filter layer 338 includes three color filters of red, green and blue. The black matrix 334 becomes a border between the color filters.

Figure 10E:
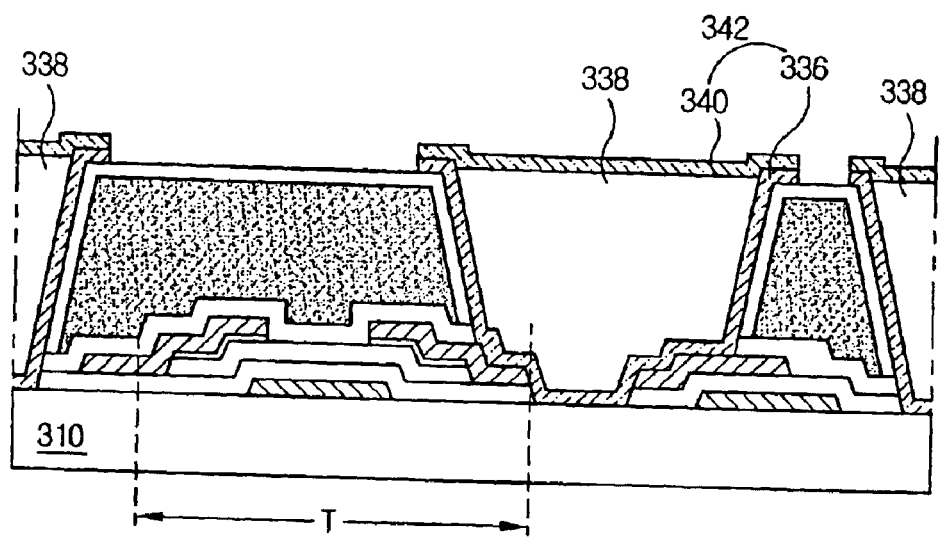
Figure 11E:
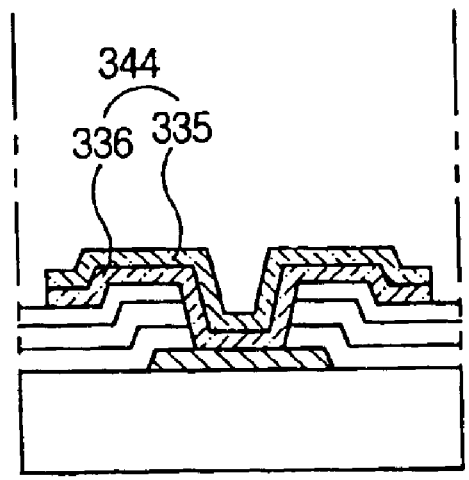
Figure 12E:
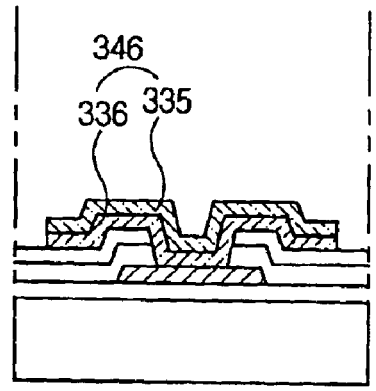

Referring to FIGS. 10E, 11E and 12E, a second transparent conductive layer 340 is formed on the color filter layer 338 and then is patterned with the first transparent conductive layer 336 through a mask process to form a pixel electrode 342, a gate pad terminal 344 and a data pad terminal 346, each of which includes the first and second transparent conductive layers 336 and 340. The pixel electrode 342 is disposed in the pixel area P and is connected to the drain electrode 324 and the second capacitor electrode 330. The gate pad terminal 344 is disposed on and contacts the gate pad 317, and the data pad terminal 346 is disposed on and contacts the data pad 328.

In the third embodiment of the present invention, since the second passivation layer 335, the first passivation layer 332 and the gate insulating layer 318 are removed in the pixel area P, there is a large step between the region where the color filter layer 338 is formed and the region where the black matrix 334 is formed. A fourth embodiment of the present invention reduces this step.

FIGS. 13A to 13E, FIGS. 14A to 14E and FIGS. 15A to 15E are cross-sectional views illustrating process steps of manufacturing an array substrate according to a fourth embodiment of the presenting invention, and follow the steps discussed in reference to FIGS. 4A to 4D, FIGS. 5A to 5D and FIGS. 6A to 6D. Thus, explanation for the steps of FIGS. 4A to 4D, FIGS. 5A to 5D and FIGS. 6A to 6D will be omitted, and the number of mask processes will also not be mentioned. Wherever possible, the same reference numbers will be used throughout the drawings to refer to the same or like parts.

Figure 13A:
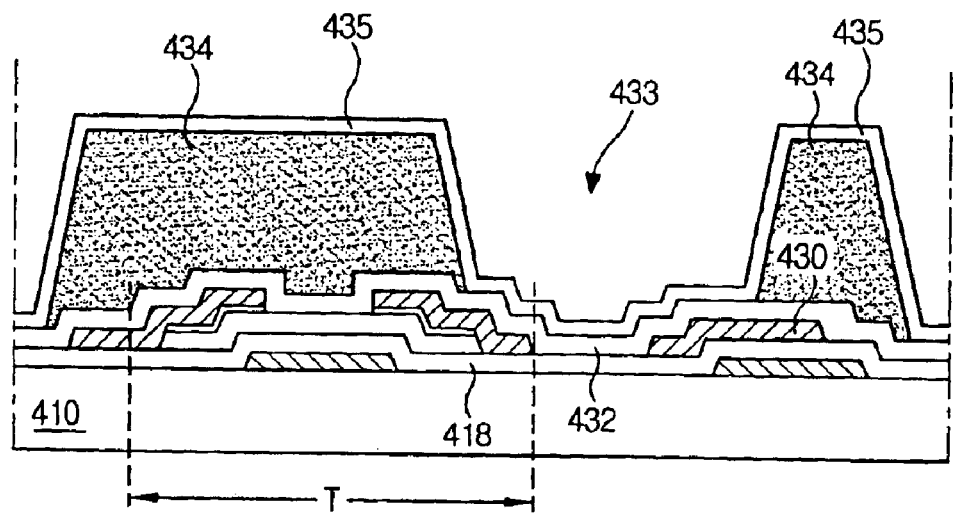
FIGS. 13A to 13E, FIGS. 14A to 14E and FIGS. 15A to 15E are cross-sectional views illustrating process steps of manufacturing an array substrate according to a fourth embodiment of the presenting invention.
Figure 14A:
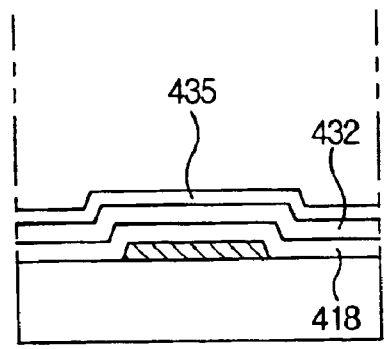
Figure 15A:
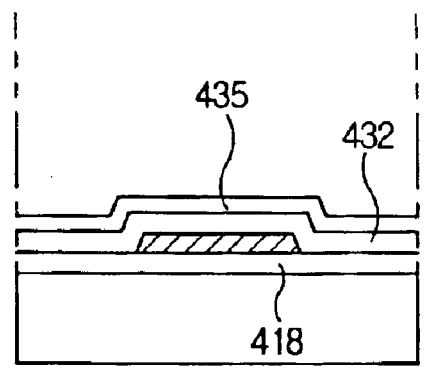

Referring to FIGS. 13A, 14A and 15A, after a first passivation layer 432, which is referred to as a passivation layer 132 in FIGS. 4D, 5D and 6D, is formed in the step of FIGS. 4D, 5D and 6D, a black matrix 434 is formed on the first passivation layer 432 by forming a light-blocking material and patterning it. The black matrix 434 has an opening 433 corresponding to a pixel area. Next, a second passivation layer 435 is formed on an entire surface of the substrate 410 including the black matrix 434. The second passivation layer 435 is made of the same material by the same method as in the third embodiment. Additionally, the second passivation layer 435 may have a thickness within a range of about 500 Å to about 3,000 Å. The black matrix 434, beneficially, may be formed under temperatures less than about 250 degrees Celsius to improve thermal stability of a black matrix material.

Figure 13B:
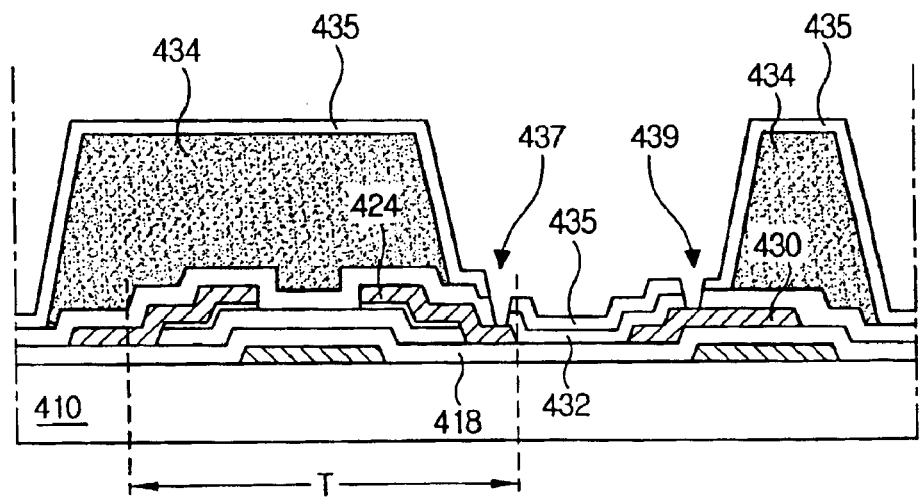
Figure 14B:
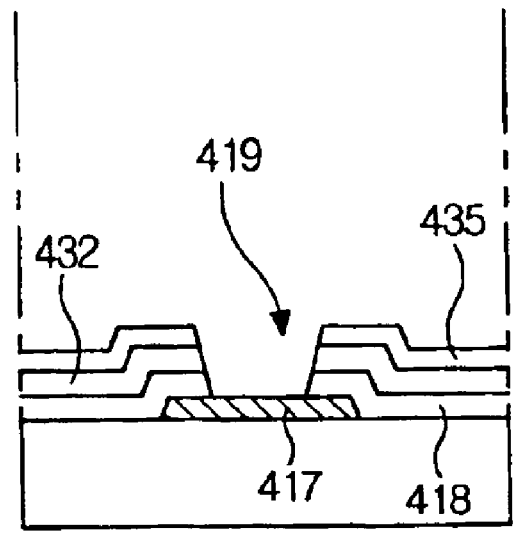
Figure 15B:
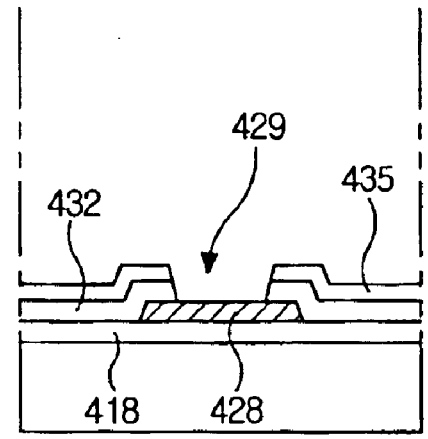

Referring to FIGS. 13B, 14B and 15B, a drain contact hole 437, a capacitor contact hole 439, a gate pad contact hole 419 and a data pad contact hole 429 are formed by patterning the second passivation layer 435, the first passivation layer 432 and the gate insulating layer 418 through a mask process. The drain contact hole 437 exposes the drain electrode 424, the capacitor contact hole 439 exposes the second capacitor electrode 430, the gate pad contact hole 419 exposes the gate pad 417, and the data pad contact hole 429 exposes the data pad 428.

The process of forming contact holes makes the gate insulating layer 418, the first passivation layer 432 and the second passivation layer 435 remaining in the pixel area P decreases the depth of the step between the region where the color filter layer will be formed later and the region where the black matrix 434 is formed. Therefore, flatness of the substrate, including layers thereon, can be improved.

Figure 13C:
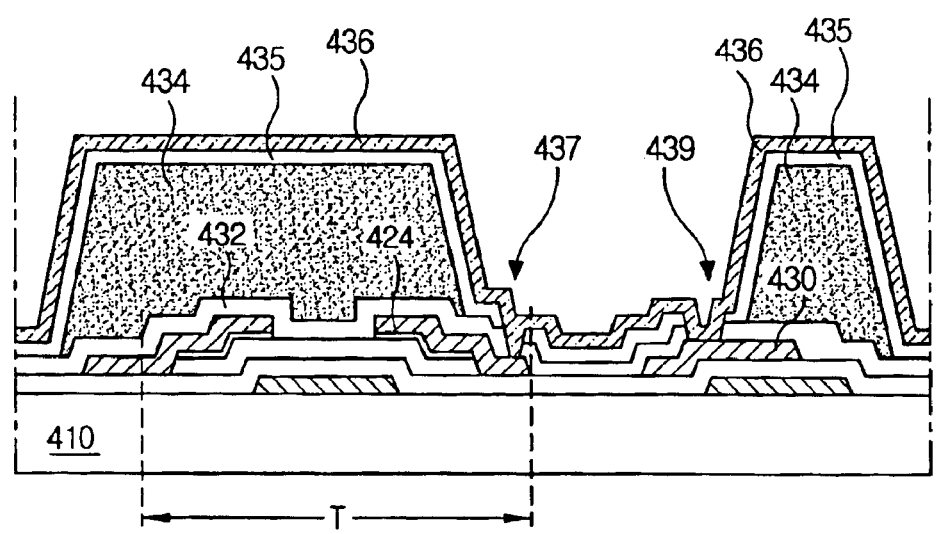
Figure 14C:
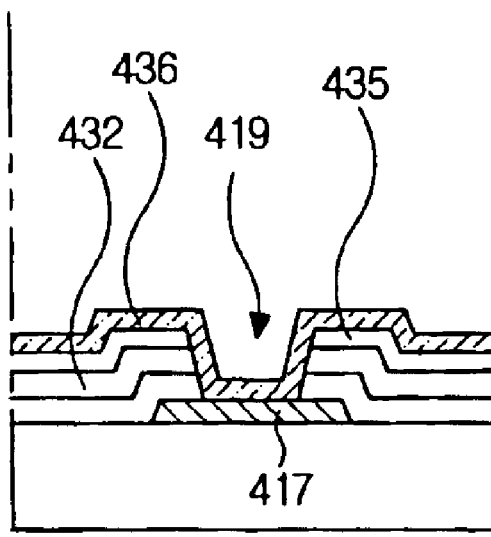
Figure 15C:
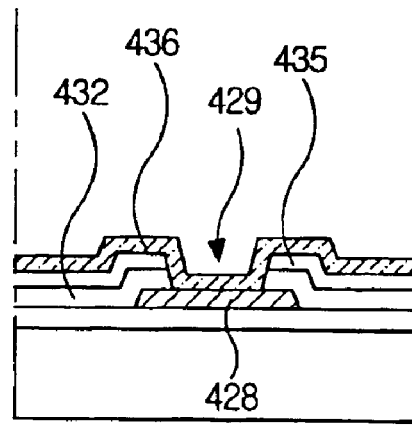

Referring to FIGS. 13C, 14C and 15C, a first transparent conductive layer 436 is formed on an entire surface of the substrate 410 including the second passivation layer 435 thereon. The first transparent conductive layer 436 contacts the drain electrode 424, the second capacitor electrode 430, the gate pad 417 and the data pad 428 via the drain contact hole 437, the capacitor contact hole 439, the gate pad contact hole 319 and the data pad contact hole 329, respectively. Here, the first transparent conductive layer 436 is formed along the sidewalls of the black matrix 434.

Figure 13D:
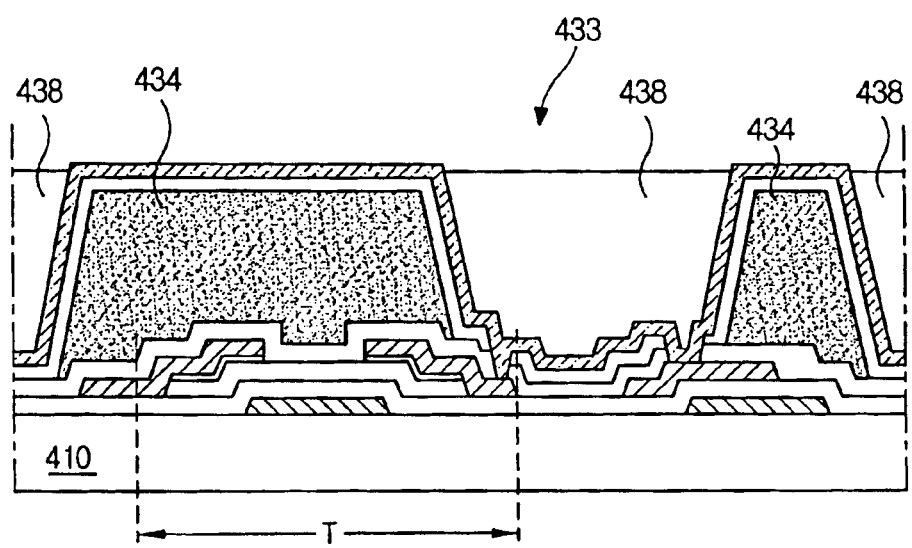
Figure 14D:
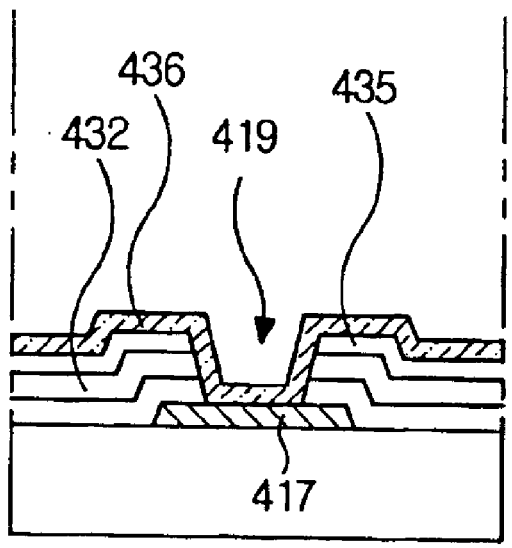
Figure 15D:
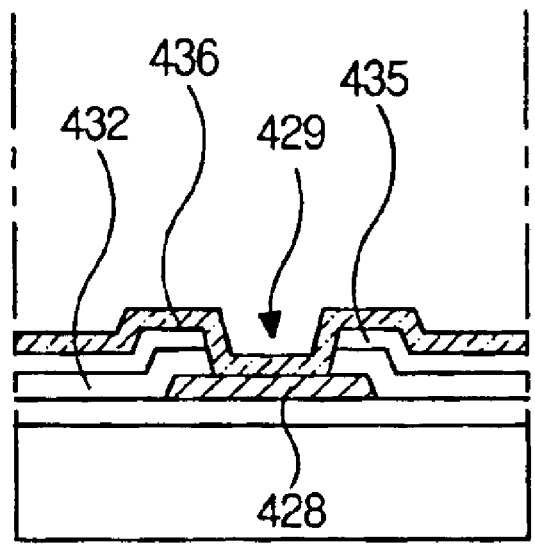

Referring to FIGS. 13D, 14D and 15D, a color filter layer 438 is formed on the first transparent conductive layer 436 in the opening 433. The color filter layer 438 includes three color filters of red, green and blue. The black matrix 434 becomes a border between the color filters.

Figure 13E:
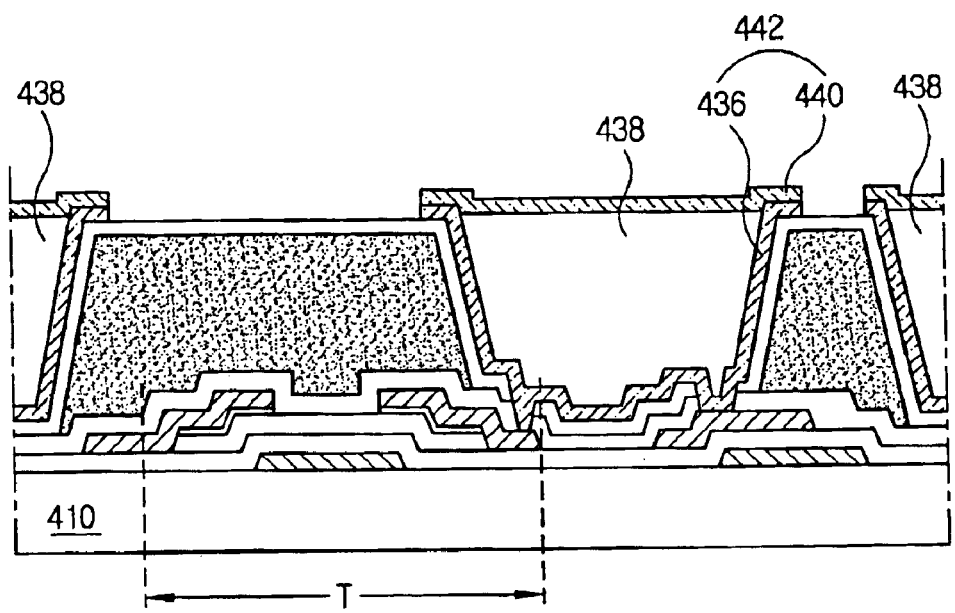
Figure 14E:
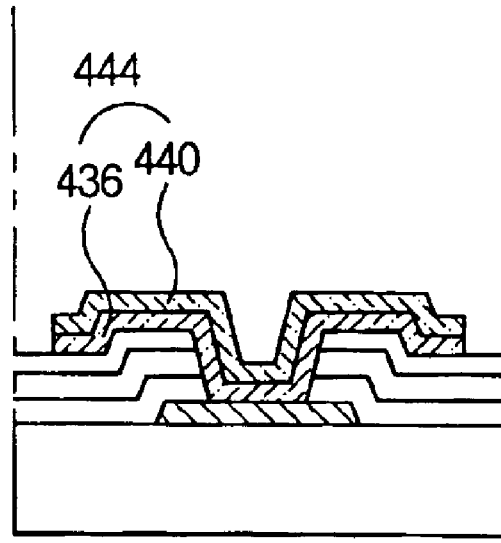
Figure 15E:
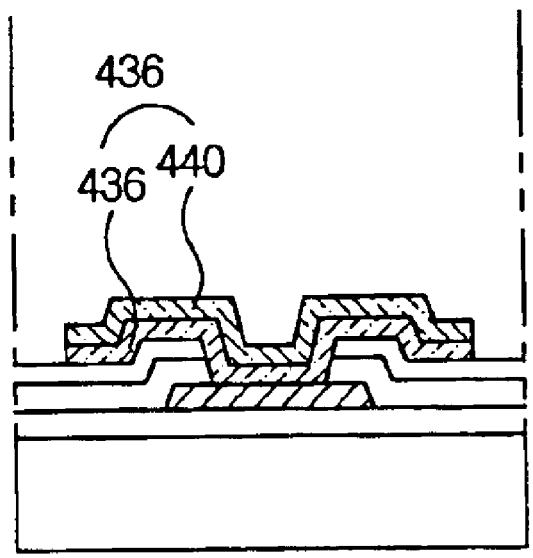

Referring to FIGS. 13E, 14E and 15E, a second transparent conductive layer 440 is formed on the color filter layer 438 and then is patterned with the first transparent conductive layer 436 through a mask process to form a pixel electrode 442, a gate pad terminal 444 and a data pad terminal 446, each of which includes the first and second transparent conductive layers 436 and 440. The pixel electrode 442 is disposed in the pixel area and is connected to the drain electrode 424 and the second capacitor electrode 430. The gate pad terminal 444 is disposed on and contacts the gate pad 417, and the data pad terminal 446 is disposed on and contacts the data pad 428.

Accordingly, in the present invention, the black matrix, the color filter layer and the array elements are formed in the same substrate, so that the liquid crystal display device can have a high aperture ratio by minimizing the alignment margin. Further, since the layers can be removed without a mask process by using the black matrix as an etch mask, the number of the manufacturing processes are reduced, and productivity of the device is increased. Additionally, since the pixel electrode has a double-layered structure, the process stability is improved during the fabricating process of the array substrate. Further, a second passivation layer is formed on the black matrix, so that process stability is improved during the fabricating process of the array substrate. Since the passivation layer can remain in the pixel area and the pixel electrode is connected to other electrode through contact holes, flatness of the substrate is improved by reduce a step between the black matrix and the color filter layer.

It will be apparent to those skilled in the art that various modifications and variations can be made in the liquid crystal display device having an array substrate of a thin film transistor structure and a manufacturing method thereof of the present invention without departing from the spirit or scope of the inventions. Thus, it is intended that the present invention covers the modifications and variations of this invention provided they come within the scope of the appended claims and their equivalents.

What is claimed is:

1. A manufacturing method of a liquid crystal display device, comprising:

forming a gate line, a gate electrode and a gate pad on a substrate;

forming a gate insulating layer on the gate line, the gate electrode and the gate pad;

forming a semiconductor layer on the gate insulating layer over the gate electrode;

forming a data line, a source electrode, a drain electrode, and a data pad, wherein the data line crosses the gate line to define a pixel area, the source and drain electrodes are disposed over the semiconductor layer spaced apart from each other, and the data pad is disposed at one end of the data line, and wherein the gate electrode, the semiconductor layer, and the source and drain electrodes constitute a thin film transistor;

forming a passivation layer covering the thin film transistor;

forming a black matrix on the passivation layer, wherein the black matrix has an opening corresponding to the pixel area and the opening exposes the passivation layer on a portion of the drain electrode;

patterning the passivation layer and the gate insulating layer by using the black matrix as an etching mask to expose the portion of the drain electrode, the gate pad, and the data pad;

forming a first transparent conductive layer on the black matrix, wherein the first transparent conductive layer contacts the portion of the drain electrode, the gate pad, and the data pad;

forming a color filter layer on the first transparent conductive layer in the opening;

forming a second transparent conductive layer on the color filter layer, the second transparent conductive layer contacting the first transparent conductive layer; and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

2. The method according to claim 1, wherein the semiconductor layer includes an active layer of amorphous silicon and an ohmic contact layer of doped amorphous silicon, and the step of forming the data line, the source electrode, the drain electrode and the capacitor electrode includes patterning the ohmic contact layer by using the source and drain electrodes as an etching mask to expose a part of the active layer.

3. The method according to claim 1, wherein the first transparent conductive layer contacts the substrate in the pixel area.

4. The method according to claim 1, wherein the passivation layer is made of an inorganic insulating material.

5. The method according to claim 1, wherein the step of forming the data line, the source electrode, the drain electrode and the data pad includes a step of forming a capacitor electrode overlapping a part of the gate line.

6. The method according to claim 5, wherein the step of forming the black matrix includes exposing the passivation layer on a portion of the capacitor electrode by the opening; the step of patterning the passivation layer and the gate insulating layer includes exposing the portion of the capacitor electrode; and the step of forming a first transparent conductive layer on the black matrix includes contacting the first transparent conductive layer with the portion of the capacitor electrode.

7. A manufacturing method of a liquid crystal display device, comprising:

forming a gate line, a gate electrode and a gate pad on a substrate;

forming a gate insulating layer on the gate line, the gate electrode and the gate pad;

forming a semiconductor layer on the gate insulating layer over the gate electrode;

forming a data line, a source electrode, a drain electrode, a capacitor electrode and a data pad, wherein the data line crosses the gate line to define a pixel area, the source and drain electrodes are disposed over the semiconductor layer spaced apart from each other, the capacitor electrode overlaps a part of the gate line, and the data pad is disposed at one end of the data line, and wherein the gate electrode, the semiconductor layer, and the source and drain electrodes constitute a thin film transistor;

forming a passivation layer covering the thin film transistor;

forming a gate pad contact hole exposing the gate pad by patterning the passivation layer and the gate insulating layer over the gate pad contact hole;

forming a black matrix on the passivation layer, wherein the black matrix has an opening corresponding to the pixel area and the opening exposes the passivation layer on portions of the drain electrode and the capacitor electrode;

selectively patterning the passivation layer by using the black matrix as an etching mask to expose the portions of the drain electrode and the capacitor electrode, and the data pad;

forming a first transparent conductive layer on the black matrix, wherein the first transparent conductive layer contacts the portions of the drain electrode and the capacitor electrode, the gate pad and the data pad;

forming a color filter layer on the first transparent conductive layer in the opening;

forming a second transparent conductive layer on the color filter layer, the second transparent conductive layer contacting the first transparent conductive layer; and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

8. The method according to claim 7, wherein the semiconductor layer includes an active layer of amorphous silicon and an ohmic contact layer of doped amorphous silicon, and the step of forming the data line, the source electrode, the drain electrode and the capacitor electrode includes patterning the ohmic contact layer by using the source and drain electrodes as an etching mask to expose a part of the active layer.

9. The method according to claim 7, wherein the first transparent conductive layer contacts the gate insulating layer in the pixel area.

10. The method according to claim 7, wherein the passivation layer is formed under lower temperature than the gate insulating layer.

11. The method according to claim 10, wherein the passivation layer is made of the same material as the gate insulating layer.

12. A manufacturing method of a liquid crystal display device, comprising:

forming a gate line, a gate electrode and a gate pad on a substrate;

forming a gate insulating layer on the gate line, the gate electrode and the gate pad;

forming a semiconductor layer on the gate insulating layer over the gate electrode;

forming a data line, a source electrode, a drain electrode, a capacitor electrode and a data pd, wherein the data line crosses the gate line to define a pixel area, the source and drain electrodes are disposed over the semiconductor layer spaced apart from each other, the capacitor electrode overlaps a part of the gate line, and the data pad is disposed at one end of the data line, and wherein the gate electrode, the semiconductor layer, and the source and drain electrodes constitute a thin film transistor;

forming a first passivation layer covering the thin film transistor;

forming a black matrix on the first passivation layer, wherein the black matrix has a first opening corresponding to the pixel area and the first opening exposes the first passivation layer on portions of the drain electrode and the capacitor electrode;

forming a second passivation layer on an entire surface of the substrate including the black matrix;

forming a second opening, a gate pad contact hole and a data pad contact hole by patterning the second passivation layer, the first passivation layer and the gate insulating layer, wherein the second opening exposes the portions of the drain electrode and the capacitor electrode, the gate pad contact hole exposes the gate pad, and the data pad contact hole exposes the data pad;

forming a first transparent conductive layer on the second passivation layer, wherein the first transparent conductive layer contacts the portions of the drain electrode and the capacitor electrode, the gate pad and the data pad;

forming a color filter layer on the first transparent conductive layer in the second opening;

forming a second transparent conductive layer on the color filter layer, the second transparent conductive layer contacting the first transparent conductive layer; and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

13. The method according to claim 12, wherein the semiconductor layer includes an active layer of amorphous silicon and an ohmic contact layer of doped amorphous silicon, and the step of forming the data line, the source electrode, the drain electrode and the capacitor electrode includes patterning the ohmic contact layer by using the source and drain electrodes as an etching mask to expose a part of the active layer.

14. The method according to claim 12, wherein the first transparent conductive layer contacts the substrate in the pixel area.

15. The method according to claim 12, wherein the first passivation layer is made of an inorganic insulating material.

16. The method according to claim 12, wherein the second passivation layer is made of one of silicon nitride (SiNx), silicon oxide (SiOx) and silicon oxynitride (SiOxNy).

17. The method according to claim 16, wherein the silicon nitride (SiNx) is formed by using silane($SiH_4$)/ammonia ($NH_3$)/nitrogen($N_2$) gases and one of hydrogen ($H_2$) gas and helium (He) gas.

18. The method according to claim 16, wherein the second passivation layer is made of silicon nitride (SiNx) formed by a plasma enhanced chemical vapor deposition method.

19. The method according to claim 16, wherein the second passivation layer is made of one of silicon nitride (SiNx), silicon oxide (SiOx) and silicon oxynitride (SiOxNy) formed by a sputtering method.

20. The method according to claim 12, wherein the second passivation layer is made of one of oxynitride (OxNy) and nitride (Nx) including carbon (C) formed by a plasma enhanced chemical vapor deposition method using 3MS (3-methoxy silane).

21. The method according to claim 12, wherein the second passivation layer has a thickness within a range of about 500 Å to about 3,000 Å.

22. The method according to claim 12, wherein the second passivation layer is formed under temperatures less than about 250 degrees Celsius.

23. A manufacturing method of a liquid crystal display device, comprising:

forming a gate line, a gate electrode and a gate pad on a substrate;

forming a gate insulating layer on the gate line, the gate electrode and the gate pad;

forming a semiconductor layer on the gate insulating layer over the gate electrode;

forming a data line, a source electrode, a drain electrode, a capacitor electrode and a data pad, wherein the data line crosses the gate line to define a pixel area, the source and drain electrodes are disposed over the semiconductor layer spaced apart from each other, the capacitor electrode overlaps a part of the gate line, and the data pad is disposed at one end of the data line, and wherein the gate electrode, the semiconductor layer, and the source and drain electrodes constitute a thin film transistor;

forming a first passivation layer covering the thin film transistor;

forming a black matrix on the first passivation layer, wherein the black matrix has an opening corresponding to the pixel area and the opening exposes the first passivation layer on portions of the drain electrode and the capacitor electrode;

forming a second passivation layer on an entire surface of the substrate including the black matrix;

forming a drain contact hole, a capacitor contact hole, a gate pad contact hole and a data pad contact hole by patterning the second passivation layer, the first passivation layer and the gate insulating layer, wherein the drain contact hole exposes the drain electrode, the capacitor contact hole exposes the capacitor electrode, the gate pad contact hole exposes the gate pad, and the data pad contact hole exposes the data pad;

forming a first transparent conductive layer on the second passivation layer, wherein the first transparent conductive layer contacts the drain electrode, the capacitor electrode, the gate pad and the data pad through the drain contact hole, the capacitor contact hole, the gate pad contact hole and the data pad contact hole, respectively;

forming a color filter layer on the first transparent conductive layer in the opening;

forming a second transparent conductive layer on the color filter layer, the second transparent conductive layer contacting the first transparent conductive layer; and forming a pixel electrode, a gate pad terminal and a data pad terminal by patterning the first and second transparent conductive layers, wherein the pixel electrode is disposed in the pixel area, the gate pad terminal is disposed on the gate pad, and the data pad terminal is disposed on the data pad.

24. The method according to claim 23, wherein the semiconductor layer includes an active layer of amorphous silicon and an ohmic contact layer of doped amorphous silicon, and the step of forming the data line, the source electrode, the drain electrode and the capacitor electrode includes patterning the ohmic contact layer by using the source and drain electrodes as an etching mask to expose a part of the active layer.

25. The method according to claim 23, wherein the second passivation layer is made of one of silicon nitride (SiNx), silicon oxide (SiOx) and silicon oxynitride (SiOxNy).

26. The method according to claim 25, wherein the silicon nitride (SiNx) is formed by using silane($SiH_4$)/ammonia ($NH_3$)/nitrogen($N_2$) gases and one of hydrogen ($H_2$) gas and helium (He) gas.

27. The method according to claim 25, wherein the second passivation layer is made of silicon nitride (SiNx) formed by a plasma enhanced chemical vapor deposition method.

28. The method according to claim 25, wherein the second passivation layer is made of one of silicon nitride (SiNx), silicon oxide (SiOx) and silicon oxynitride (SiOxNy) formed by a sputtering method.

29. The method according to claim 23, wherein the second passivation layer is made of one of oxynitride (OxNy) and nitride (Nx) including carbon (C) formed by a plasma enhanced chemical vapor deposition method using 3MS(3-methoxy silane).

30. The method according to claim 23, wherein the second passivation layer has a thickness within a range of about 500 Å to about 3,000 Å.

31. The method according to claim 23, wherein the second passivation layer is formed under temperatures less than about 250 degrees Celsius.

32. A liquid crystal display device having an array substrate, comprising:

a gate line and a data line on a substrate, crossing each other to define a pixel area;

a thin film transistor at a crossing of the gate line and the data line, and having a gate electrode, a source electrode and a drain electrode;

a gate pad at one end of the gate line and a data pad at one end of the data line;

a first passivation layer covering the thin film transistor and exposing the gate pad and the data pad;

a black matrix on the first passivation layer, wherein the black matrix has a first opening corresponding to the pixel area and the first opening exposes a portion of the drain electrode;

a first pixel electrode on the black matrix in the pixel area, and contacting the portion of the drain electrode;

a color filter layer on the first pixel electrode in the pixel area;

a second pixel electrode on the color filter layer, and contacting the first pixel electrode; and a gate pad terminal contacting the gate pad and a data pad terminal contacting the data pad.

33. The device according to claim 32, wherein the first pixel electrode contacts the substrate in the pixel area.

34. The device according to claim 32, wherein the passivation layer is made of an inorganic insulating material.

35. The device according to claim 32, further comprising a capacitor electrode overlapping a part of the gate line, the capacitor electrode made of the same material as the data line.

36. The device according to claim 35, wherein the first opening exposes a portion of the capacitor electrode through the passivation layer and the first pixel electrode contacts the portion of the capacitor electrode.

37. The device according to claim 32, further comprising a second passivation layer between the black matrix and the first pixel electrode.

38. The device according to claim 37, wherein the second passivation layer includes a second opening exposing the portion of the drain electrode through the first passivation layer.

39. The device according to claim 37, wherein the second passivation layer includes a drain contact hole exposing a part of the drain electrode through the first passivation layer.

40. The device according to claim 39, wherein the first pixel electrode contacts the second passivation layer in the pixel area.

41. The device according to claim 37, wherein the second passivation layer includes a gate pad contact hole exposing the gate pad and a data pad contact hole exposing the data pad.

42. The device according to claim 37, wherein the second passivation layer is made of one of silicon nitride (SiNx), silicon oxide (SiOx) and silicon oxynitride (SiOxNy).

43. The device according to claim 37, wherein the second passivation layer has a thickness within a range of about 500 Å to about 3,000 Å.

* * * * *